US012674809B2

(12) United States Patent
Kameyama et al.

(10) Patent No.: US 12,674,809 B2
(45) Date of Patent: Jul. 7, 2026

(54) SPECIMEN ANALYSIS METHOD AND SPECIMEN ANALYZER

(71) Applicant: Sysmex Corporation, Kobe (JP)

(72) Inventors: Naoya Kameyama, Kobe (JP); Tomoyuki Nishida, Kobe (JP); Yasuhiro Takeuchi, Kobe (JP); Takayuki Arai, Kobe (JP); Masahiro Mimura, Kobe (JP)

(73) Assignee: SYSMEX CORPORATION, Hyogo (JP)

( * ) Notice: Subject to any disclaimer, the term of this patent is extended or adjusted under 35 U.S.C. 154(b) by 767 days.

(21) Appl. No.: 18/067,483

(22) Filed: Dec. 16, 2022

(65) Prior Publication Data

US 2023/0204613 A1     Jun. 29, 2023

(30) Foreign Application Priority Data

Dec. 23, 2021     (JP) ................................. 2021-209579

(51) Int. Cl.
G01N 35/00             (2006.01)

(52) U.S. Cl.
CPC ...   G01N 35/0092 (2013.01); G01N 35/00732 (2013.01); G01N 35/00871 (2013.01); *G01N 2035/00851* (2013.01); *G01N 2035/00891* (2013.01)

(58) Field of Classification Search
CPC ......... G01N 35/0092; G01N 35/00732; G01N 35/00871; G01N 2035/00851; G01N 2035/00891; G01N 2333/4709; G01N 2800/28; G01N 33/6896; G01N 2800/2821

USPC ...................................................... 422/65, 50
See application file for complete search history.

(56) References Cited

U.S. PATENT DOCUMENTS

2009/0215184 A1*   8/2009   Wakamiya ....... G01N 35/00623
                                                                  422/64

FOREIGN PATENT DOCUMENTS

| EP | 1881329 A2 | 1/2008 |
| EP | 2177912 A2 | 4/2010 |
| EP | 2402766 A1 | 1/2012 |
| JP | 5108366 B2 | 12/2012 |
| JP | 5964813 B2 | 8/2016 |
| WO | WO 2012/128345 A2 | 9/2012 |

(Continued)

OTHER PUBLICATIONS

Suzanne E. Schindler et al., "High-precision plasma β-amyloid 42/40 predicts current and future brain amyloidosis", Neurology®, 2019, pp. e1647-e1659, vol. 93, No. 17, American Academy of Neurology; Cited in the specification.

(Continued)

*Primary Examiner* — Christine T Mui
(74) *Attorney, Agent, or Firm* — Crowell & Moring LLP

(57)             ABSTRACT

Disclosed is a specimen analysis method for analyzing a specimen regarding a plurality of measurement items, the specimen analysis method comprising: measuring a first measurement item and a second measurement item on the basis of a measurement order; executing a process related to a time difference between a measurement of the first measurement item and a measurement of the second measurement item; and obtaining a calculation value from a measurement value of the first measurement item and a measurement value of the second measurement item.

13 Claims, 31 Drawing Sheets

(56)     References Cited

FOREIGN PATENT DOCUMENTS

WO        2021/200940 A1      10/2021

OTHER PUBLICATIONS

Malgorzata Rozga et al., "Preanalytical sample handling recommendations for Alzheimer's disease plasma biomarkers", Alzheimer's & Dementia: Diagnosis, Assessment & Disease Monitoring, 2019, pp. 291-300, vol. 11, the Alzheimer's Association.
Kazuto Yamashita et al., "Fully automated chemiluminescence enzyme immunoassays showing high correlation with immunoprecipitation mass spectrometry assays for β-amyloid (1-40) and (1-42) in plasma samples", Biochemical and Biophysical Research Communications, 2021, pp. 22-26, vol. 576, Elsevier Inc.
Press Release of "Sysmex Obtains Manufacturing and Marketing Approval for Novel Coronavirus Detection Reagent (RT-PCR Method) ", Apr. 15, 2021, pp. 1-4, Sysmex Corporation.
The extended European search report issued on May 12, 2023 in a counterpart European patent application No. 22214509.6.
Japanese language Office Action issued in Japanese Application No. 2021-209579 dated Sep. 2, 2025, with English translation (10 pages).

* cited by examiner

Figure 12:
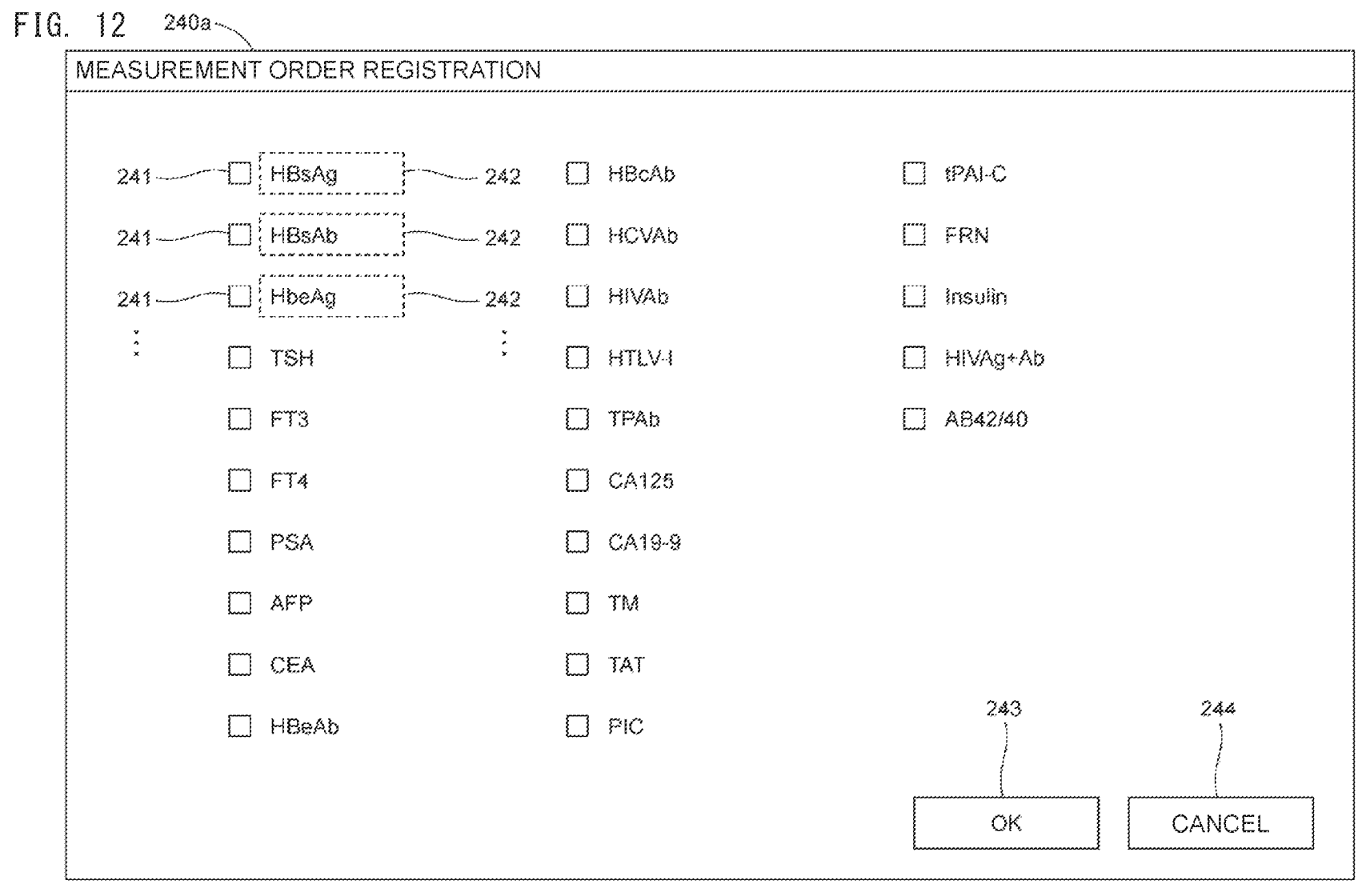

MEASUREMENT ORDER REGISTRATION

241 — □ HBsAg    242
241 — □ HBsAb    242
241 — □ HbeAg    242
⋮
□ TSH
□ FT3
□ FT4
□ PSA
□ AFP
□ CEA
□ HBeAb

□ HBcAb
□ HCVAb
□ HIVAb
□ HTLV-I
□ TPAb
□ CA125
□ CA19-9
□ TM
□ TAT
□ PIC
⋮

□ tPAI-C
□ FRN
□ Insulin
□ HIVAg+Ab
□ AB42/40

OK  243

CANCEL  244

TIME FLOW

MODIFICATION 1 OF
EMBODIMENT 1

MODIFICATION 2 OF
EMBODIMENT 1

EMBODIMENT 2

SPECIMEN ANALYSIS METHOD AND SPECIMEN ANALYZER

RELATED APPLICATIONS

This application claims priority to Japanese Patent Application No. 2021-209579, filed on Dec. 23, 2021, the entire content of which is incorporated herein by reference.

BACKGROUND OF THE INVENTION

1. Field of the Invention

The present invention relates to a specimen analysis method and a specimen analyzer for analyzing a specimen regarding a plurality of measurement items.

2. Description of the Related Art

In a specimen analyzer, a specimen is measured and analyzed per measurement item. A measurement value of each measurement item is referred to in, for example, diagnosis. A calculation value calculated from measurement values of a plurality of measurement items has clinical significance in some cases. For example, in Suzanne E Schindler and 11 others, "High-precision plasma β-amyloid 42/40 predicts current and future brain amyloidosis", Neurology, August, 2019, vol, 93, no. 17, p. e1647 to e1659, it is reported that a ratio between a measurement value of amyloid beta 40 (Aβ 1-40) and a measurement value of amyloid beta 42 (Aβ 1-42) is effective in diagnosing Alzheimer-type dementia.

Among measurement items that are measured by the specimen analyzer, there are measurement items corresponding to target substances, in a specimen, the amounts of which decrease in association with elapse of time. For example, amyloid beta 40 and amyloid beta 42 in a blood specimen collected from a subject decrease in association with elapse of time. Therefore, the reliability of the above ratio might decrease depending on the measurement conditions for these measurement items.

SUMMARY OF THE INVENTION

The scope of the present invention is defined solely by the appended claims, and is not affected to any degree by the statements within this summary.

A specimen analysis method of the present invention is directed to a specimen analysis method for analyzing a specimen regarding a plurality of measurement items. The specimen analysis method of the present invention includes: measuring a first measurement item and a second measurement item on the basis of a measurement order (S103, S105); executing a process related to a time difference between a measurement of the first measurement item and a measurement of the second measurement item (S101, S107, S111, S131, S132); and obtaining a calculation value from a measurement value of the first measurement item and a measurement value of the second measurement item (S109).

A specimen analyzer (1) of the present invention is directed to a specimen analyzer configured to analyze a specimen regarding a plurality of measurement items. The specimen analyzer (1) of the present invention includes a measurement device (2) configured to measure the specimen, and a controller (101). The controller (101) is programmed to control the measurement device (2) to measure a first measurement item and a second measurement item on the basis of a measurement order, execute a process related to a time difference between a measurement of the first measurement item and a measurement of the second measurement item, and obtain a calculation value from a measurement value of the first measurement item and a measurement value of the second measurement item.

BRIEF DESCRIPTION OF THE DRAWINGS

FIG. 12 schematically shows a configuration of a modification of the screen for allowing an operator to register a measurement order;

DETAILED DESCRIPTION OF THE PREFERRED EMBODIMENTS

Embodiment 1

Figure 1:
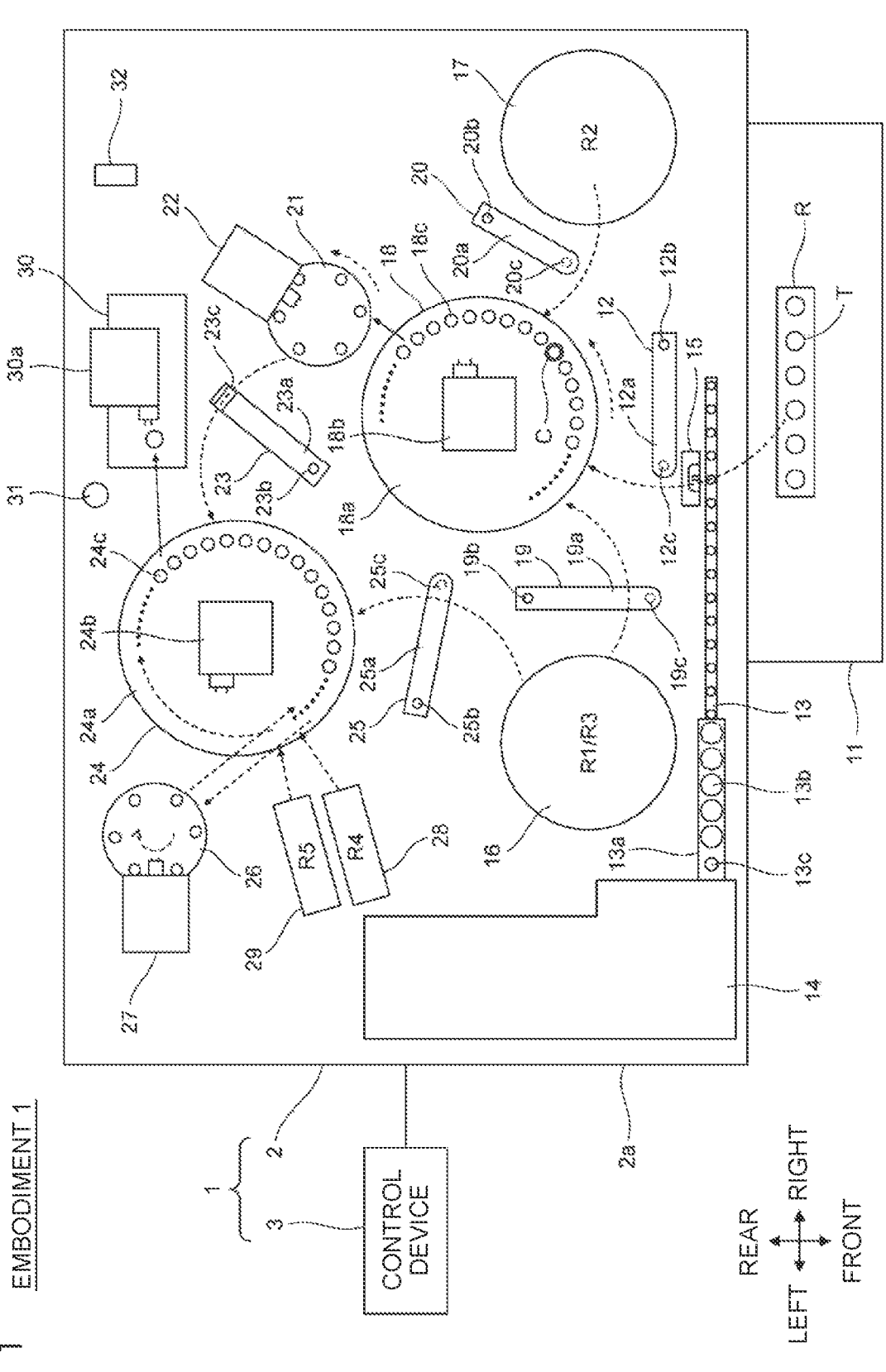
FIG. 1 schematically shows a configuration of a specimen analyzer according to Embodiment 1.

FIG. 1 schematically shows a configuration of a specimen analyzer 1 according to Embodiment 1. The specimen analyzer 1 analyzes a specimen regarding a plurality of measurement items. Among the plurality of measurement items, there is a combination (described later) of measurement items that need to be measured at as close timings as possible. In the specimen analyzer 1, a process related to a time difference between measurements is executed on such a combination of measurement items.

In FIG. 1, for convenience, a measurement device 2 is shown in a state where a housing 2a thereof is transparent so that components inside the measurement device 2 in a plan view are shown. In addition, a left-right direction and a front-rear direction in the plan view of the measurement device 2 are indicated in FIG. 1.

The specimen analyzer 1 is an immuno analyzer for performing tests on a specimen regarding various items such as hepatitis B, hepatitis C, a tumor marker, a thyroid hormone, and a dementia marker. The specimen is, for example, whole blood, plasma, serum, cerebrospinal fluid (CSF), or the like.

The specimen analyzer 1 includes the measurement device 2 and a control device 3. The measurement device 2 includes a specimen transport unit 11, a specimen dispensing unit 12, an urgent specimen/tip transport unit 13, a pipette tip supply device 14, a tip detachment unit 15, reagent tables 16 and 17, a primary reaction unit 18, reagent dispensing units 19 and 20, a primary BF separation table 21, a primary BF separation unit 22, a transfer mechanism 23, a secondary reaction unit 24, a reagent dispensing unit 25, a secondary BF separation table 26, a secondary BF separation unit 27, an R4 reagent dispensing unit 28, an R5 reagent dispensing unit 29, a detector 30, a disposal hole 31, and a temperature sensor 32.

In a measurement by the measurement device 2, a specimen and an R1 reagent (a reagent containing a capture antibody that binds to a protein such as an antigen or a peptide contained in the specimen) are mixed with each other, and an R2 reagent (a reagent containing magnetic particles that bind to the capture antibody) is added to the obtained liquid mixture. The magnetic particles and the capture antibody having bound to the protein are attracted to a magnet of the primary BF separation unit 22, and a contaminant that has not been attracted to the magnet is removed through suction so that the R1 reagent containing an unreacted capture antibody is removed. An R3 reagent (a reagent containing a labeled antibody) is added to a sample resulting from the treatment by the primary BF separation unit 22. The magnetic particles and the labeled antibody having bound to the protein are attracted to a magnet of the secondary BF separation unit 27, and a contaminant that has not been attracted to the magnet is removed through suction so that the R3 reagent containing an unreacted labeled antibody is removed. An R4 reagent (liquid dispersion) and an R5 reagent (a luminescent substrate that emits light in a process of a reaction with the labeled antibody) are added to a sample resulting from the treatment by the secondary BF separation unit 27. Then, the amount of light generated through a reaction between the labeled antibody and the luminescent substrate is measured. Through such a process, the protein contained in the specimen is quantitatively measured. In measurements of measurement items 1-40 and 1-42 described later, a specimen diluent is used as the R1 reagent, and antibody-immobilizing particles are used as the R2 reagent.

When measurements of specimens are started, an operator causes containers T accommodating the specimens to be held on a rack R. Holding portions capable of holding a plurality of the containers T are formed on the rack R. The operator sets the rack R holding the containers T onto the specimen transport unit 11.

The specimen transport unit 11 transports the rack R having been set by the operator to a suction position of the specimen dispensing unit 12. The specimen dispensing unit 12 sequentially suctions, at the suction position, the specimens in the plurality of the containers T held on the rack R. In the specimen analyzer 1, in order to prevent any of the specimens suctioned and discharged by the specimen dispensing unit 12 from being mixed with another one of the specimens, a disposable pipette tip is exchanged every time a specimen is suctioned and discharged.

The urgent specimen/tip transport unit 13 includes a transport rack 13a capable of being moved in the left-right direction. Container placement portions 13b and a tip placement portion 13c are formed on the transport rack 13a. A container T accommodating an urgent specimen that needs to be tested so as to take precedence over a specimen being transported by the specimen transport unit 11 is held in any of the container placement portions 13b. The container T held in the container placement portion 13b is transported in the right direction and positioned so as to overlap with a rotation trajectory of a pipette 12c of the specimen dispensing unit 12.

The pipette tip supply device 14 sets supplied pipette tips into the tip placement portion 13c one by one. The pipette tip held in the tip placement portion 13c is transported in the right direction and positioned so as to overlap with the rotation trajectory of the pipette 12c of the specimen dispensing unit 12. The tip detachment unit 15 is used to detach a pipette tip mounted to the specimen dispensing unit 12.

The specimen dispensing unit 12 includes an arm portion 12a, a shaft 12b, and the pipette 12c. The arm portion 12a is rotated around the shaft 12b and moved in an up-down direction. The pipette 12*c* is located at a distal end of the arm portion 12*a*, and suctions and discharges each specimen. The pipette tip transported by the tip placement portion 13*c* is mounted at a lower end of the pipette 12*c*. The specimen dispensing unit 12 suctions each of the specimens in the containers T transported by the specimen transport unit 11 and the transport rack 13*a*.

The reagent tables 16 and 17 are composed of tables that are driven to rotate. On the reagent table 16, a reagent container accommodating the R1 reagent and a reagent container accommodating the R3 reagent are placed. On the reagent table 17, a reagent container accommodating the R2 reagent is placed.

The primary reaction unit 18 includes a primary reaction table 18*a* and a container transfer portion 18*b*. On the primary reaction table 18*a*, holding portions 18*c* for holding cuvettes C are formed.

The reagent dispensing unit 19 includes an arm 19*a*, a shaft 19*b*, and a pipette 19*c*. The arm 19*a* is rotated around the shaft 19*b* and moved in the up-down direction. The pipette 19*c* is located at a distal end of the arm 19*a*. The reagent dispensing unit 19 suctions the R1 reagent in the reagent container placed on the reagent table 16 and discharges the suctioned R1 reagent into an empty cuvette C on the primary reaction unit 18. The specimen dispensing unit 12 dispenses any of the suctioned specimens into the cuvette C into which the R1 reagent has been discharged. Thereafter, on the primary reaction unit 18, the specimen and the R1 reagent in the cuvette C are subjected, for a predetermined time, to a primary reaction treatment so as to be heated to a predetermined temperature.

The reagent dispensing unit 20 has the same configuration as that of the reagent dispensing unit 19 and includes an arm 20*a*, a shaft 20*b*, and a pipette 20*c*. The reagent dispensing unit 20 suctions the R2 reagent in the reagent container placed on the reagent table 17 and discharges the suctioned R2 reagent into the cuvette C which is located on the primary reaction unit 18 and into which the specimen and the R1 reagent have been discharged.

The primary reaction unit 18 drives the primary reaction table 18*a* so as to rotationally transfer the cuvette C on a corresponding one of the holding portions 18*c* and stirs the specimen, the R1 reagent, and the R2 reagent in the cuvette C. Thereafter, on the primary reaction unit 18, the specimen, the R1 reagent, and the R2 reagent in the cuvette C are subjected, for a predetermined time, to a secondary reaction treatment so as to be heated to a predetermined temperature. Consequently, the R2 reagent containing the magnetic particles and the protein in the specimen react with each other in the cuvette C. The container transfer portion 18*b* transfers, onto the primary BF separation table 21, the cuvette C having been subjected to the treatment by the primary reaction unit 18.

The primary BF separation unit 22 performs a primary BF separation treatment in which the R1 reagent containing an unreacted capture antibody is removed from the sample in the cuvette C on the primary BF separation table 21.

The transfer mechanism 23 includes an arm 23*a*, a shaft 23*b*, and a grip portion 23*c*. The arm 23*a* is rotated around the shaft 23*b* and moved in the up-down direction. The grip portion 23*c* is located at a distal end of the arm 23*a* and is configured to be capable of gripping the cuvette C. The transfer mechanism 23 transfers, onto the secondary reaction unit 24, the cuvette C which is located on the primary BF separation table 21 and which has been subjected to the treatment by the primary BF separation unit 22.

The secondary reaction unit 24 has the same configuration as that of the primary reaction unit 18 and includes a secondary reaction table 24*a* and a container transfer portion 24*b*. On the secondary reaction table 24*a*, holding portions 24*c* for holding cuvettes C are formed.

The reagent dispensing unit 25 has the same configuration as that of the reagent dispensing unit 19 and includes an arm portion 25*a*, a shaft 25*b*, and a pipette 25*c*. The reagent dispensing unit 25 suctions the R3 reagent in the reagent container placed on the reagent table 16 and discharges the suctioned R3 reagent into the cuvette C which is located on the secondary reaction unit 24 and into which the specimen, the R1 reagent, and the R2 reagent have been discharged. Thereafter, on the secondary reaction unit 24, the specimen, the R1 reagent, the R2 reagent, and the R3 reagent in the cuvette C are subjected, for a predetermined time, to a tertiary reaction treatment so as to be heated to a predetermined temperature. The container transfer portion 24*b* of the secondary reaction unit 24 transfers, onto the secondary BF separation table 26, the cuvette C into which the R3 reagent has been discharged.

The secondary BF separation unit 27 has the same configuration as that of the primary BF separation unit 22 and performs a secondary BF separation treatment in which the R3 reagent containing an unreacted labeled antibody is removed from the sample in the cuvette C on the secondary BF separation table 26. The container transfer portion 24*b* of the secondary reaction unit 24 transfers, into any of the holding portions 24*c* of the secondary reaction unit 24 again, the cuvette C which is located on the secondary BF separation table 26 and which has been subjected to the treatment by the secondary BF separation unit 27.

The R4 reagent dispensing unit 28 and the R5 reagent dispensing unit 29 move nozzle portions parallelly and upward/downward, to respectively supply the R4 reagent and the R5 reagent into the cuvette C on the secondary reaction unit 24.

The secondary reaction unit 24 drives the secondary reaction table 24*a* so as to rotationally transfer the cuvette C in the holding portion 24*c* and stirs the specimen and the R1 to R5 reagents in the cuvette C. Thereafter, on the secondary reaction unit 24, the specimen and the R1 to R5 reagents in the cuvette C are subjected, for a predetermined time, to a quaternary reaction treatment so as to be heated to a predetermined temperature. Consequently, in the cuvette C, the R3 reagent containing the labeled antibody and the protein in the specimen react with each other, and the R5 reagent containing the luminescent substrate and the labeled antibody of the R3 reagent react with each other.

The detector 30 includes a transfer mechanism unit 30*a* which transfers the cuvette C held in the holding portion 24*c* of the secondary reaction unit 24 to the detector 30. The detector 30 detects, by a photodetector such as a photomultiplier tube, light generated through the reaction process between the luminescent substrate and the labeled antibody having bound to the protein of the specimen.

The cuvette C having been used is disposed of into the disposal hole 31 by the transfer mechanism unit 30*a* of the detector 30.

The temperature sensor 32 is placed, near the detector 30, inside the housing 2*a* of the measurement device 2. The temperature sensor 32 is, for example, a thermistor. The temperature sensor 32 detects a temperature of the inside of the housing 2*a* of the measurement device 2. The temperature detected by the temperature sensor 32 is used for determining whether or not the environmental temperature of the inside of the measurement device 2 is appropriate for measurement. The placement position of the temperature sensor 32 only has to be inside the housing 2a and is not limited to the vicinity of the detector 30.

Figure 2:
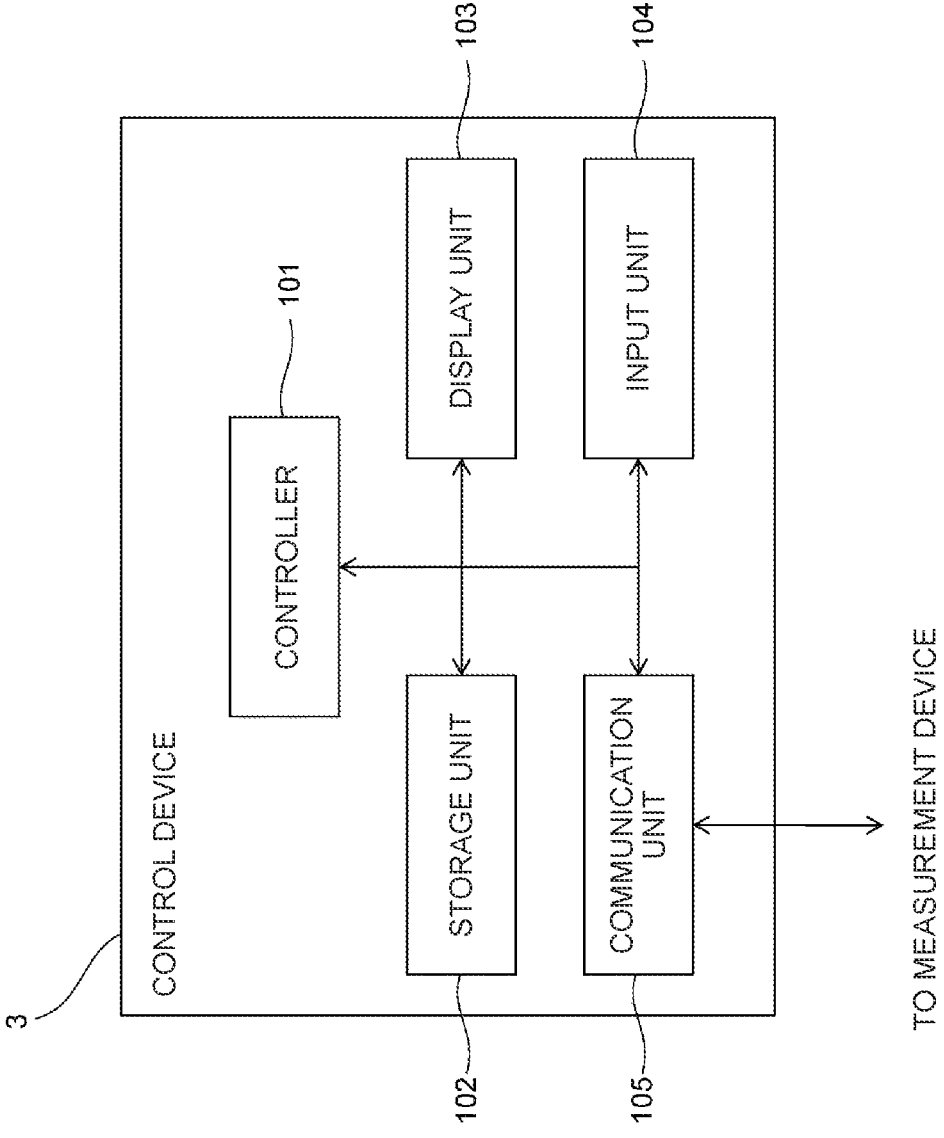
FIG. 2 is a block diagram schematically showing a configuration of a control device according to Embodiment 1.

FIG. 2 is a block diagram schematically showing a configuration of the control device 3.

The control device 3 includes a controller 101, a storage unit 102, a display unit 103, an input unit 104, and a communication unit 105.

The controller 101 is implemented by, for example, a processor such as a CPU. The storage unit 102 is implemented by, for example, an SSD, an HDD, a RAM, or the like. The display unit 103 is, for example, a liquid crystal display or an organic electroluminescence display. The display unit 103 displays various screens in accordance with signals from the controller 101. The display unit 103 displays screens 200, 210, 220, 230, 240, 250, and 260 described later. The input unit 104 is, for example, a mouse or a keyboard. The input unit 104 transmits a signal based on an operation by a user to the controller 101. The display unit 103 and the input unit 104 may be integrally formed as a touch-panel-type display. The communication unit 105 is, for example, a network card. Via the communication unit 105, the controller 101 controls each unit of the measurement device 2 and receives a signal from the measurement device 2.

The controller 101 controls each unit of the measurement device 2 via the communication unit 105 such that the operations described with reference to FIG. 1 are performed for each of the plurality of measurement items. Consequently, the measurement device 2 dispenses a specimen in one container T into cuvettes C correspondingly to the number of the measurement items that are set for the specimen. The measurement device 2 dispenses reagents corresponding to the measurement items into the cuvettes C, prepares a measurement sample for each of the measurement items as described above, and detects, by the detector 30, light generated from the measurement sample. The controller 101 converts the amount of the light detected by the detector 30 into a measurement value that is the concentration of a measurement-target protein.

Examples of the measurement items that can be set in Embodiment 1 include HBsAg, HBsAb, HBeAg, TSH, FT3, FT4, PSA, AFP, CEA, HBeAb, HBcAb, HCVAb, HIVAb, HTLV-I, TPAb, CA125, CA19-9, TM, TAT, PIC, tPAI-C, FRN, insulin, HIVAg+Ab, 1-40, 1-42, and the like. Further, examples of calculation items that can be set in Embodiment 1 include AB42/40.

The measurement item 1-40 is an item related to amyloid beta 1-40, and the measurement item 1-42 is an item related to the amyloid beta 1-42. The calculation item AB42/40 is an item related to a ratio obtained by dividing a measurement value of the measurement item 1-42 by a measurement value of the measurement item 1-40.

Meanwhile, if a blood specimen is collected from a subject, amyloid beta 1-40 and amyloid beta 1-42 in the collected blood specimen decrease in association with elapse of time. However, it is known that the rates of decreases in amyloid beta 1-40 and amyloid beta 1-42 are approximately equal to each other.

Therefore, measurements related to the measurement items 1-40 and 1-42 for calculating the calculation item AB42/40 are performed at as close timings as possible. For example, the measurements are performed such that a time difference therebetween is not longer than 1 hour at most, preferably not longer than 30 minutes, and more preferably not longer than 15 minutes. The reason for this is as follows. If measurements related to the measurement items 1-40 and 1-42 are performed at close timings, the times having elapsed from the collection from the subject become approximately equal to each other. Thus, the rates of decreases in amyloid beta 1-40 and amyloid beta 1-42 in the specimen dispensed from the one container T into each of a cuvette C for the measurement item 1-40 and a cuvette C for the measurement item 1-42, become approximately equal to each other. In this case, the rates of decreases in the measurement value of the measurement item 1-42 as a numerator and the measurement value of the measurement item 1-40 as a denominator offset each other in calculation of a calculation value (ratio) of the calculation item AB42/40. Therefore, if measurements of the measurement items 1-40 and 1-42 are performed at close timings, the reliability of the calculation value (ratio) of the calculation item AB42/40 can be kept high.

From this viewpoint, in Embodiment 1, the specimen analyzer 1 is controlled such that measurements of the measurement items 1-40 and 1-42 are performed at close timings. For example, processing is performed such that the time difference between a measurement of the measurement item 1-40 and a measurement of the measurement item 1-42 is equal to or shorter than a predetermined time (for example, 1 hour, 30 minutes, 15 minutes, or the like) as described later. Hereinafter, screens and control of the specimen analyzer 1 controlled from the above viewpoint will be described.

In addition, as a result of thorough research by the present inventors, it has been found that a temperature range for a measurement environment in which the reliability of the measurement value of the measurement item 1-40 can be kept high is narrower than a temperature range for a measurement environment in which the reliability of the measurement value of the measurement item 1-42 can be kept high. From this viewpoint, in Embodiment 1, the specimen analyzer 1 is controlled such that the temperature range for an allowable measurement environment regarding the measurement item 1-40 is narrower than the temperature range for an allowable measurement environment regarding the measurement item 1-42. For example, as described later, a temperature range of not lower than 24° C. and not higher than 31° C. is set as an appropriate temperature range for the measurement item 1-40, and a temperature range of not lower than 14° C. and not higher than 38° C. is set as an appropriate temperature range for the measurement item 1-42.

Figure 3:
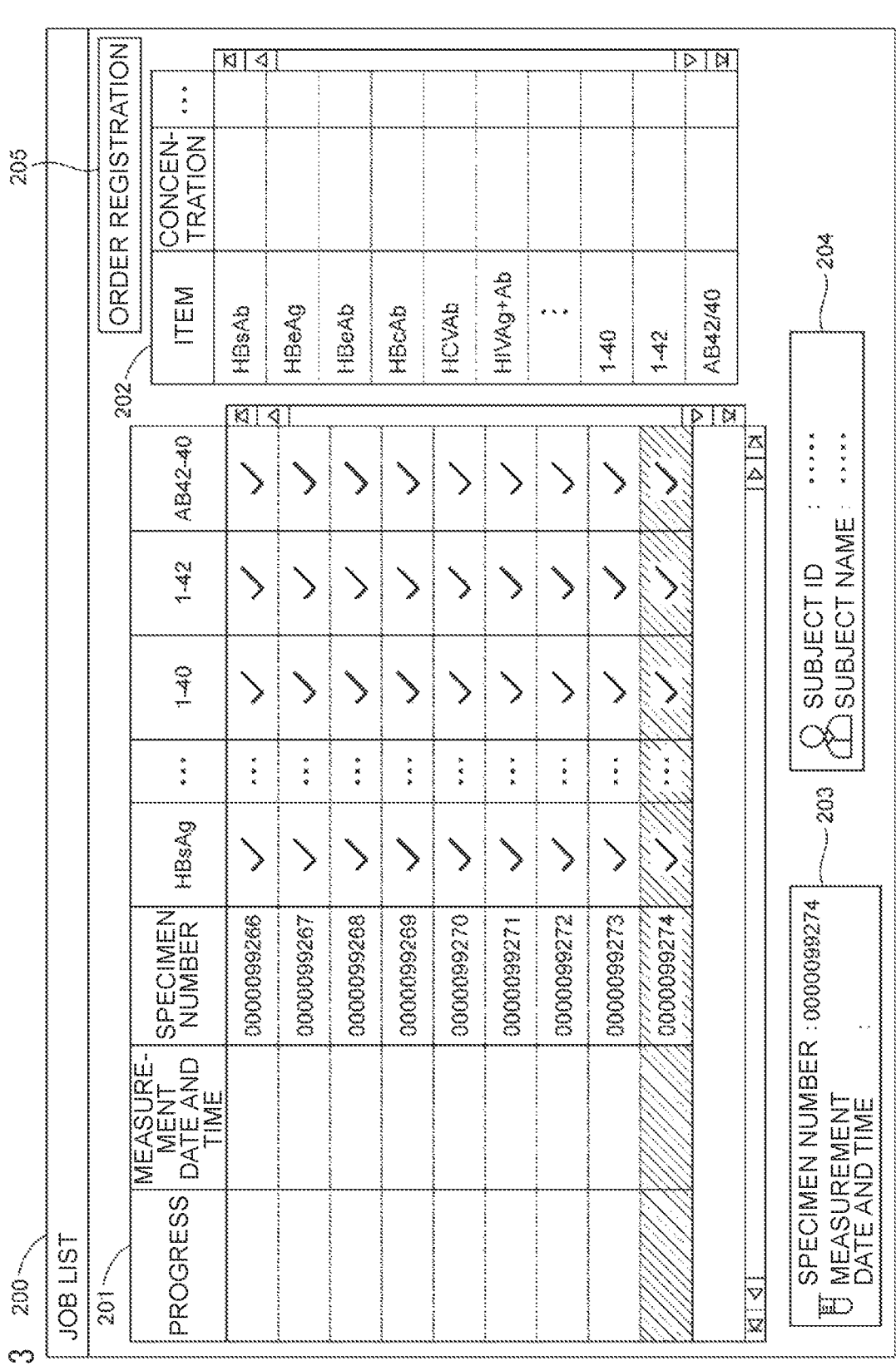
FIG. 3 schematically shows a configuration of a screen displaying a job list, according to Embodiment 1.

FIG. 3 schematically shows a configuration of a screen 200, displaying a job list, which is displayed on the display unit 103.

The screen 200 includes a job list display region 201, a detail display region 202, a specimen information display region 203, a subject information display region 204, and an order registration button 205.

The job list display region 201 is a region in which various types of information such as a measurement order and a measurement value obtained as a result of each measurement, which are associated with each of specimen numbers, are displayed. The job list display region 201 includes: an item of progress, an item of measurement date and time, and an item of specimen number; and a plurality of measurement items and a calculation item. The item of progress indicates a state, of each of jobs, such as a state where measurements have been completed, a state where measurement values have been approved, or an error state. The specimen number is a number that enables individual identification of a specimen accommodated in a container T.

In each of the measurement items in the job list display region 201, a check mark is displayed before measurement if the measurement item is scheduled to be measured. The check mark in each of the measurement items is displayed on the basis of a measurement order preset for the specimen. The measurement order is obtained from a host computer communicably connected to the control device 3. Alternatively, the measurement order is manually inputted by an operator via an order-registering screen 240 (FIGS. 11 to 13), described later, which is displayed on the display unit 103 by selecting the order registration button 205 through an operation of the input unit 104 by the operator. In addition, regarding each of the measurement items in the job list display region 201, a measurement value of the measurement item, a calculation value, or the like is displayed after measurement.

An operator performs an operation of selecting one row of the job list display region 201 via the input unit 104, thereby being able to select information (job) corresponding to the row. In an example shown in FIG. 3, a job for a specimen number "0000099274" at a lowermost row is selected, and this row is highlighted.

The detail display region 202 is a region in which information about the job selected in the job list display region 201, such as measurement values of the respective measurement items and a calculation value of a calculation item is displayed. In the example shown in FIG. 3, for the job on the selected row, no measurement process has yet been performed by the measurement device 2, and thus the detail display region 202 is blank.

The specimen information display region 203 is a region in which the specimen number, the measurement date and time, and the like for the job selected in the job list display region 201 are displayed. The subject information display region 204 is a region in which a subject ID, a subject name, and the like for the job selected in the job list display region 201 are displayed.

Figure 4:
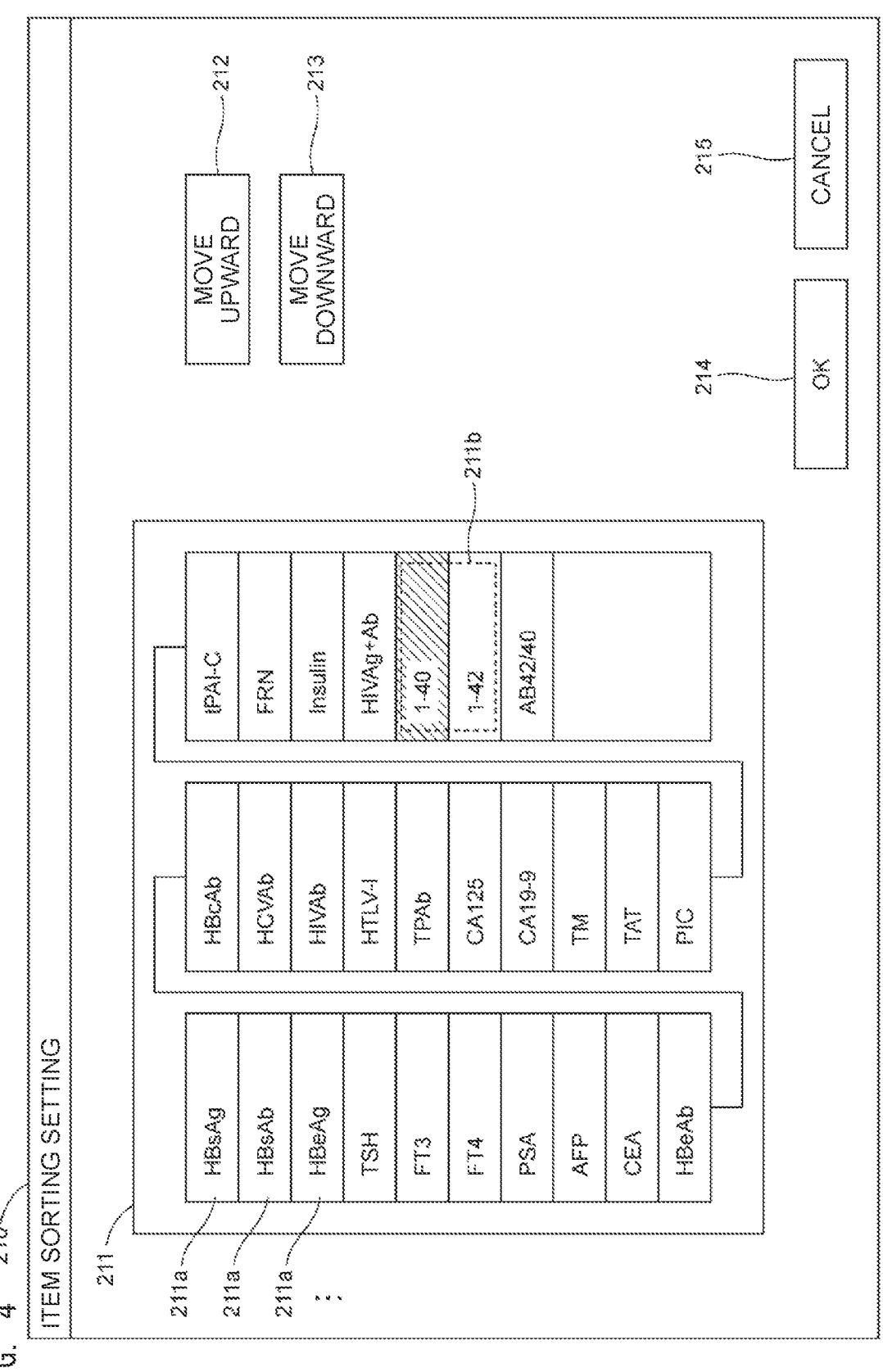
FIG. 4 schematically shows a configuration of a screen for performing item sorting setting, according to Embodiment 1.

FIG. 4 schematically shows a configuration of a screen 210, for performing item sorting setting, which is displayed on the display unit 103.

The screen 210 includes a sorting list display region 211, an upward movement button 212, a downward movement button 213, an OK button 214, and a cancel button 215.

In the sorting list display region 211, blocks 211a corresponding to all measurement items and a calculation item that can be measured and analyzed by the specimen analyzer 1 are arranged. On the blocks 211a, measurement item names and a calculation item name are displayed. The arrangement of the plurality of blocks 211a indicates a sequence according to which measurements related to the plurality of measurement items are performed. When measurement for one specimen is started, a measurement of a measurement item indicated on an upper left block 211a is performed earliest, and a measurement of a measurement item indicated on a lower right block 211a is performed latest. In an example shown in FIG. 4, a measurement of a measurement item HBsAg is performed earliest, and a measurement of the measurement item 1-42 is performed latest. The screen 210 in FIG. 4 indicates an example in which blocks 211a corresponding to the measurement items 1-40 and 1-42 are arranged so as to be adjacent to each other.

An operator performs an operation of selecting any of the blocks 211a via the input unit 104, thereby being able to select a measurement item corresponding to the block 211a. In the example shown in FIG. 4, a block 211a for the measurement item 1-40 is selected, and this block 211a is highlighted. When an operator operates the upward movement button 212 in a state where any of the blocks 211a is selected, the selected block 211a is moved to an immediately-above measurement rank in the sorting list display region 211. Meanwhile, when an operator operates the downward movement button 213 in this state, the selected block 211a is moved to an immediately-below measurement rank in the sorting list display region 211.

Figure 5:
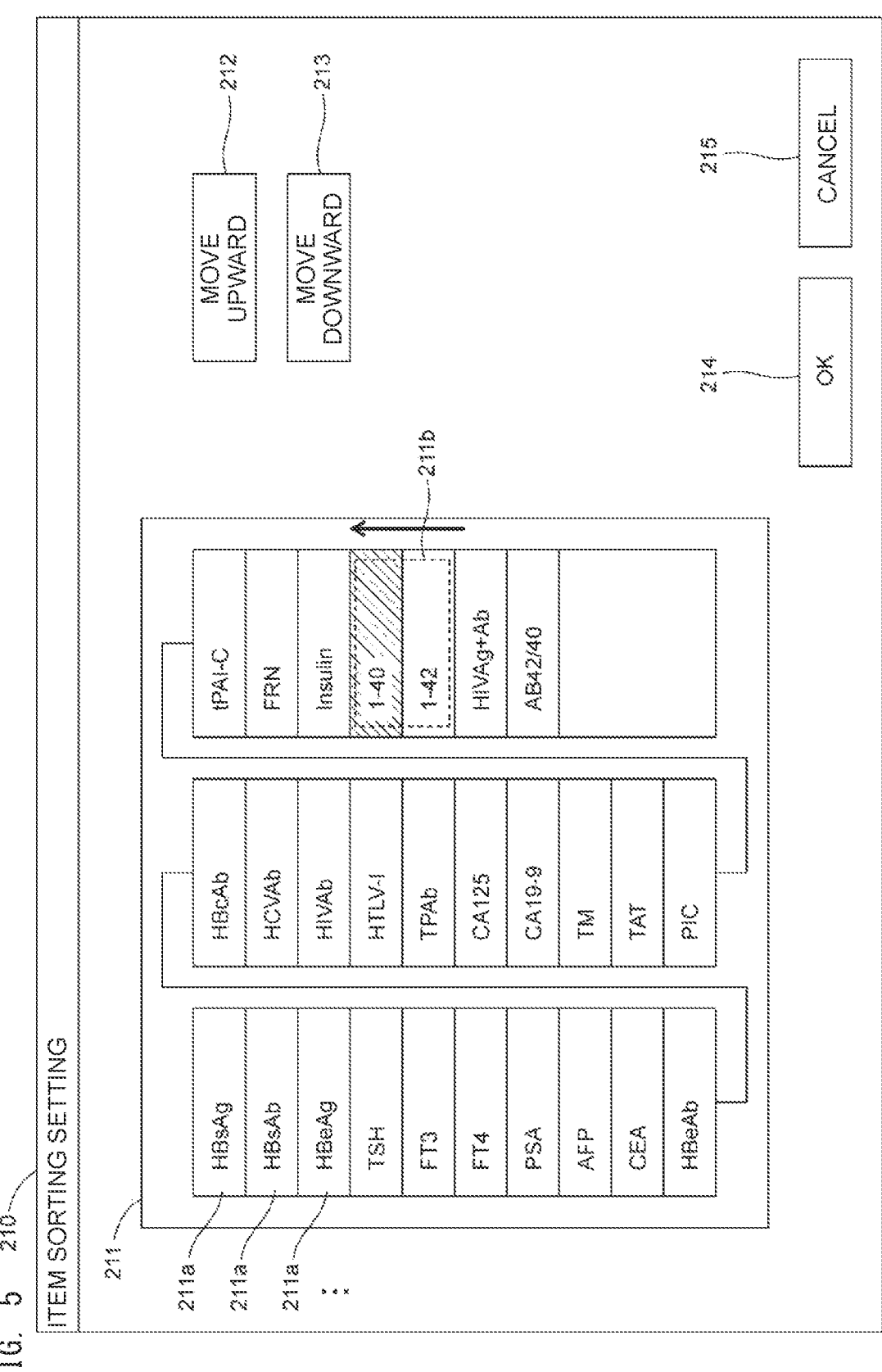
FIG. 5 schematically shows a configuration of the screen for performing item sorting setting, according to Embodiment 1.

As described above, measurements related to the measurement items 1-40 and 1-42 are preferably performed at close timings. From this viewpoint, in Embodiment 1, when an operator operates the upward movement button 212 or the downward movement button 213 in a state where either of the two blocks 211a corresponding to the measurement items 1-40 and 1-42 is selected, the measurement ranks of these two blocks 211a (group 211b) among all the measurement items are changed with the blocks 211a being kept arranged so as to be adjacent to each other in terms of the measurement ranks thereof as shown in FIG. 5.

Figure 6:
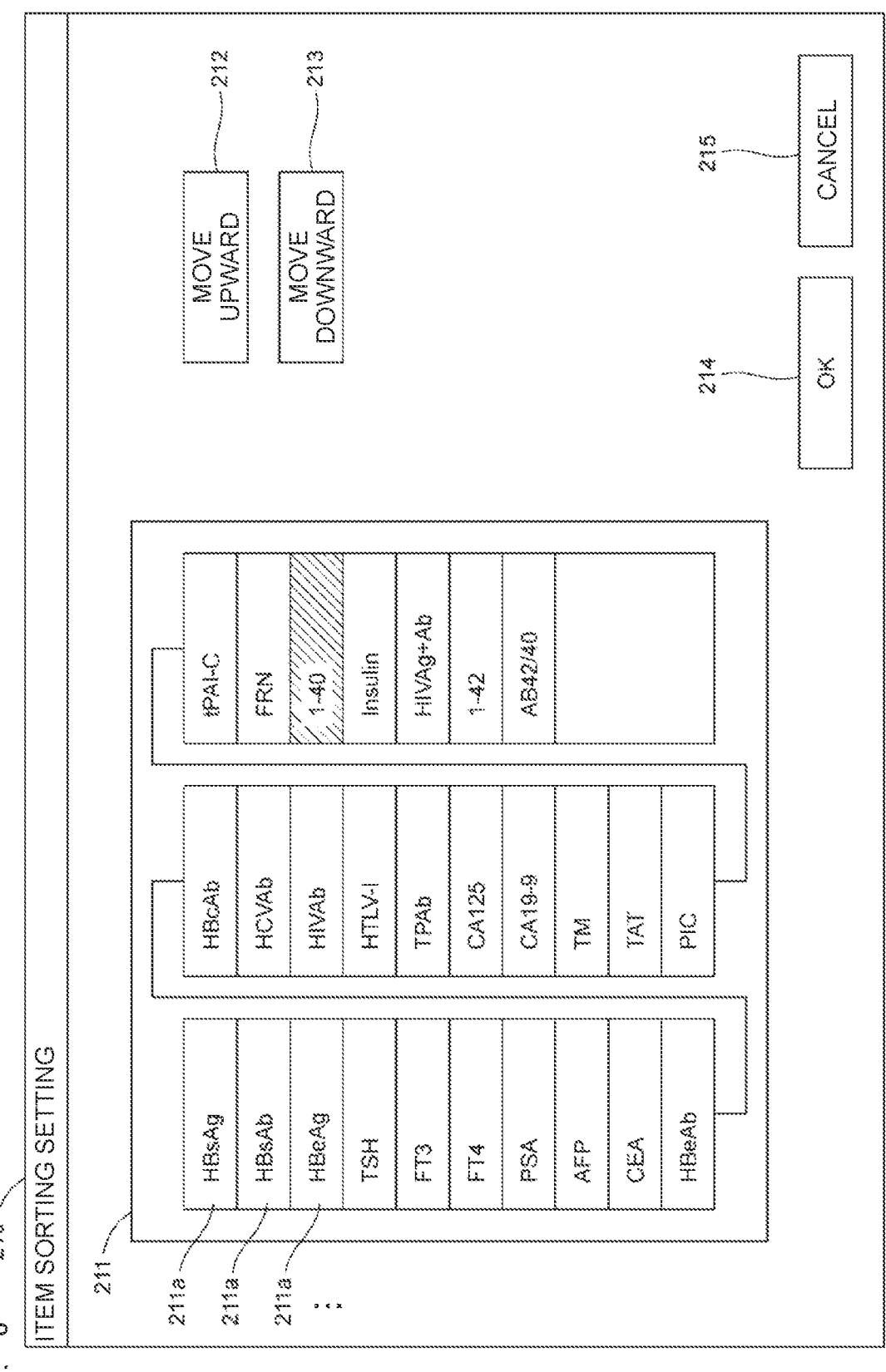
FIG. 6 schematically shows a configuration of the screen for performing item sorting setting, according to a modification of Embodiment 1.
Figure 7:
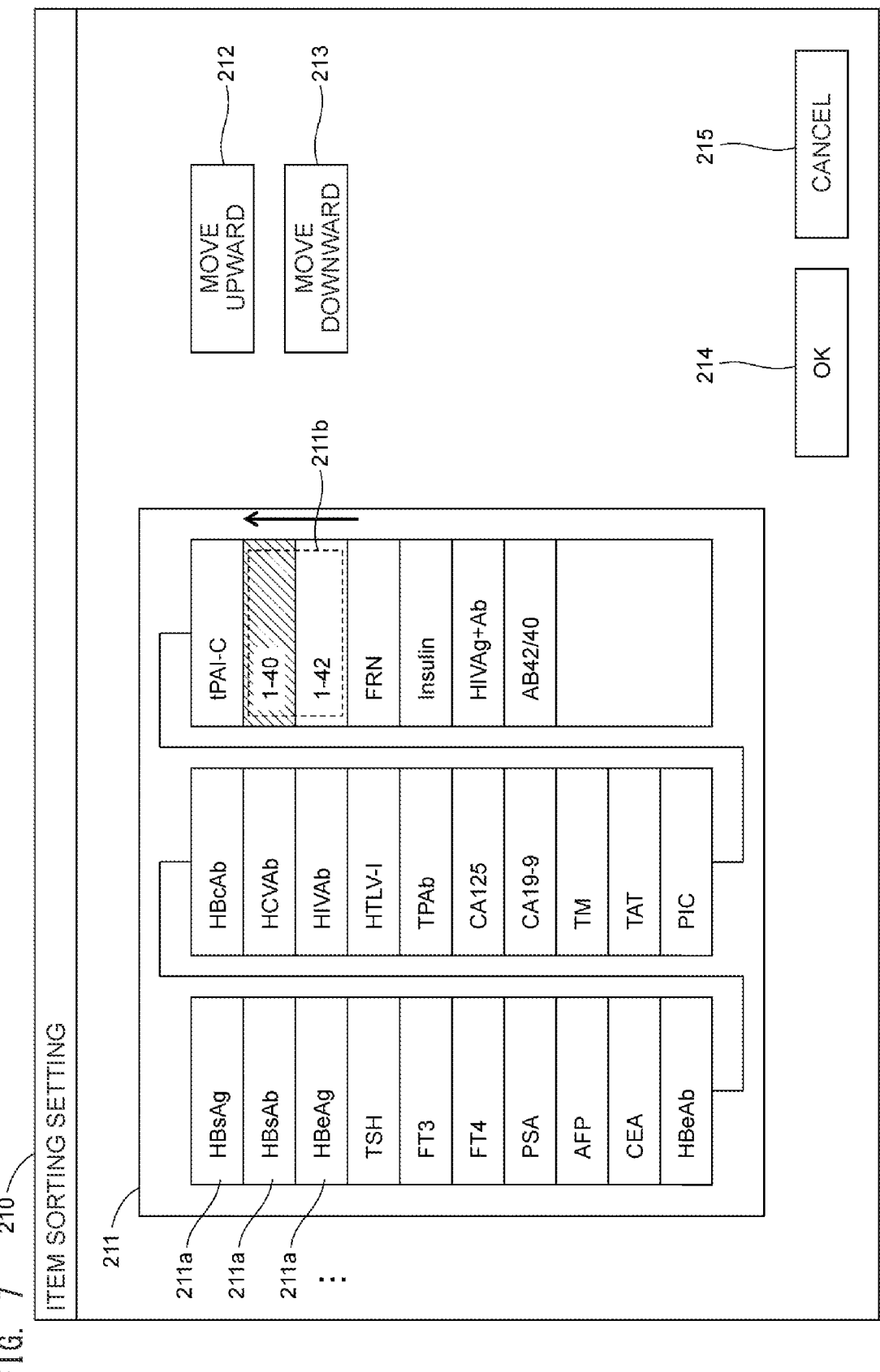
FIG. 7 schematically shows a configuration of the screen for performing item sorting setting, according to the modification of Embodiment 1.

Meanwhile, if the blocks 211a corresponding to the measurement items 1-40 and 1-42 are arranged so as not to be adjacent to each other as shown in FIG. 6, when an operator operates the upward movement button 212 or the downward movement button 213 in a state where either of the two blocks 211a corresponding to the measurement items 1-40 and 1-42 is selected, the measurement ranks of these two blocks 211a (group 211b) among all the measurement items are changed with the blocks 211a being rearranged so as to be adjacent to each other in terms of the measurement ranks thereof as shown in FIG. 7.

Consequently, measurements of the measurement items 1-40 and 1-42 are always performed consecutively, and thus the reliability of the calculation value (ratio) of the calculation item AB42/40 can be kept high.

When an operator operates the OK button 214, the controller 101 stores, in the storage unit 102, the measurement ranks of the measurement items on the basis of the arrangement sequence of the blocks 211a having been set in the sorting list display region 211, and closes the screen 210. When an operator operates the cancel button 215, the controller 101 discards the content having been set in the sorting list display region 211 and closes the screen 210.

In FIGS. 4 to 7, the blocks 211a may be moved by performing a drag-and-drop operation on the blocks 211a instead of using the upward movement button 212 and the downward movement button 213. In this case as well, the blocks 211a for the measurement items 1-40 and 1-42 are moved as the group 211b.

Figure 8:
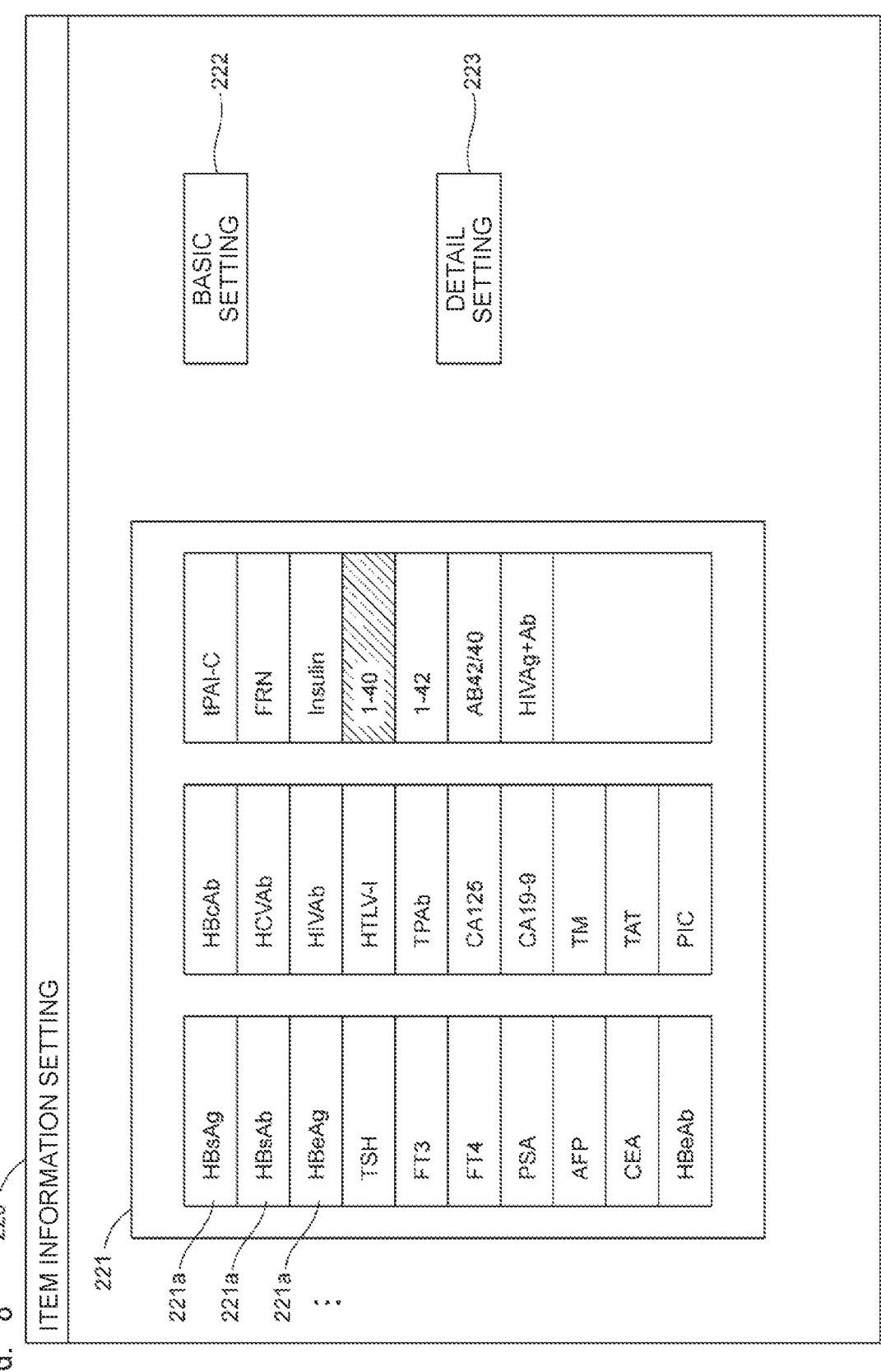
FIG. 8 schematically shows a configuration of a screen for performing item information setting, according to Embodiment 1.

FIG. 8 schematically shows a configuration of a screen 220, for performing item information setting by an administrator, which is displayed on the display unit 103.

The screen 220 includes an item list display region 221, a basic setting button 222, and a detail setting button 223. An administrator who performs maintenance of the specimen analyzer 1 or the like performs, after logging in by using the authority of an administrator, a predetermined operation to display the screen 220.

In the item list display region 221, the blocks 221a corresponding to all the measurement items that can be measured and analyzed by the specimen analyzer 1 are arranged. On the blocks 221a, the measurement item names and the calculation item name are displayed. The blocks 221a are arranged in accordance with the measurement ranks having been set in the screen 210 in FIGS. 4 to 7.

The administrator performs an operation of selecting a block 221a via the input unit 104, thereby being able to select a measurement item corresponding to the block 221a. In an example shown in FIG. 8, the block 221a for the measurement item 1-40 is selected. When the administrator operates the basic setting button 222 in a state where a block 221*a* is selected, a screen for setting, for example, a displayed item name, a display range for a measurement value, a unit of the measurement value, and the like for basic setting regarding the selected measurement item is displayed on the display unit 103. When the administrator operates the detail setting button 223 in a state where a block 221*a* is selected, a screen for performing additional setting on the selected measurement item is displayed on the display unit 103. When the detail setting button 223 is operated in a state where the measurement item 1-40 is selected as shown in FIG. 8, a screen 230 (shown in FIG. 9) for adding a re-measurement condition is displayed on the display unit 103.

Figure 9:
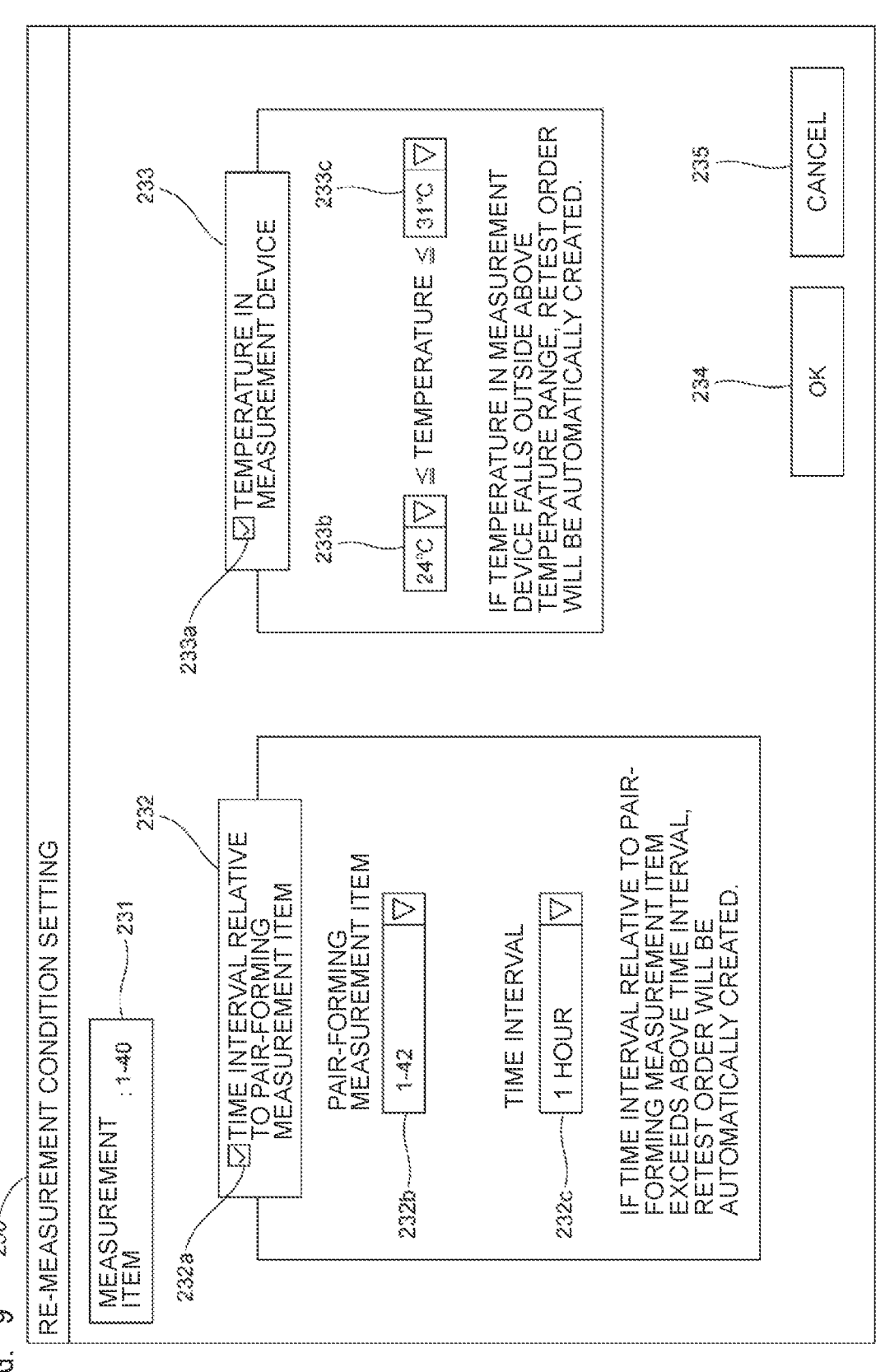
FIG. 9 schematically shows a configuration of a screen for performing additional setting regarding a measurement item, according to Embodiment 1.

FIG. 9 schematically shows a configuration of the screen 230, for performing additional setting regarding the measurement item 1-40, which is displayed on the display unit 103.

The screen 230 includes a measurement item display region 231, a time interval setting region 232, and a temperature setting region 233.

A measurement item name "1-40" is displayed in the measurement item display region 231 so as to make it understandable that the screen 230 is for setting related to the measurement item 1-40.

The time interval setting region 232 includes a checkbox 232*a* and pull-down menus 232*b* and 232*c*. If the administrator desires to enable setting of the pull-down menus 232*b* and 232*c*, the administrator performs an operation via the input unit 104, to check off the checkbox 232*a*. Consequently, setting of a time interval between a measurement of the measurement item 1-40 and a measurement of a measurement item to form a pair with the measurement item 1-40, is enabled.

The pull-down menu 232*b* is a menu for selecting a measurement item to form a pair with the measurement item 1-40. The pull-down menu 232*c* is a menu for selecting a maximum time interval between a measurement of the measurement item 1-40 and a measurement of the measurement item to form a pair with the measurement item 1-40. The administrator operates the pull-down menu 232*b*, selects a measurement item to form a pair with the measurement item 1-40, operates the pull-down menu 232*c*, and selects a time interval, via the input unit 104. In FIG. 9, the measurement item 1-42 is selected as a measurement item to form a pair with the measurement item 1-40, and "1 hour" is selected as a time interval.

If setting in the time interval setting region 232 is made as shown in FIG. 9, when the time interval between a measurement of the measurement item 1-40 and a measurement of the measurement item 1-42 exceeds 1 hour, each of the measurement values of the measurement items 1-40 and 1-42 is indicated as a measurement error, and no calculation value (ratio) of the calculation item AB42/40 is outputted. In this case, an order for measuring the measurement items 1-40 and 1-42 again is automatically created. Consequently, outputting of a calculation value having a low reliability can be avoided, and re-setting of a measurement order makes it possible to automatically provide an opportunity in which a calculation value having a high reliability can be obtained.

The temperature setting region 233 includes a checkbox 233*a* and pull-down menus 233*b* and 233*c*. If the administrator desires to enable setting of the pull-down menus 233*b* and 233*c*, the administrator performs an operation via the input unit 104, to check off the checkbox 233*a*. Consequently, setting of an appropriate temperature range for measurement of the measurement item 1-40 is enabled.

The pull-down menus 233*b* and 233*c* are menus for respectively setting a lower limit and an upper limit of the appropriate temperature range for measurement of the measurement item 1-40. The administrator operates the pull-down menus 233*b* and 233*c* and sets an appropriate temperature range for measurement of the measurement item 1-40, via the input unit 104. In FIG. 9, a temperature range of not lower than 24° C. and not higher than 31° C. is set as an appropriate temperature range for measurement of the measurement item 1-40. The temperature range is important for obtaining an appropriate measurement value in the measurement of the measurement item 1-40, and thus such a temperature range is preferably set.

If setting in the temperature setting region 233 is made as shown in FIG. 9, when the temperature in a measurement of the measurement item 1-40 is outside the above temperature range, not only the measurement of the measurement item 1-40 but also a measurement of the measurement item 1-42 forming a pair with the measurement item 1-40 is canceled. Consequently, each of the measurement values of the measurement items 1-40 and 1-42 is indicated as a measurement error, and no calculation value (ratio) of the calculation item AB42/40 is outputted. In this case as well, an order for measuring the measurement items 1-40 and 1-42 again is automatically created. Consequently, outputting of a calculation value having a low reliability can be avoided, and re-setting of a measurement order makes it possible to automatically provide an opportunity in which a calculation value having a high reliability can be obtained.

When the administrator operates an OK button 234, if the checkbox 232*a* is in a checked state, the controller 101 stores, in the storage unit 102, the pair-forming measurement item and the time interval having been set in the time interval setting region 232, and, if the checkbox 233*a* is in a checked state, the controller 101 stores, in the storage unit 102, the temperature range having been set in the temperature setting region 233. Thereafter, the controller 101 closes the screen 230. When the administrator operates a cancel button 235, the controller 101 discards the content having been set in the screen 230 and closes the screen 230.

Figure 10:
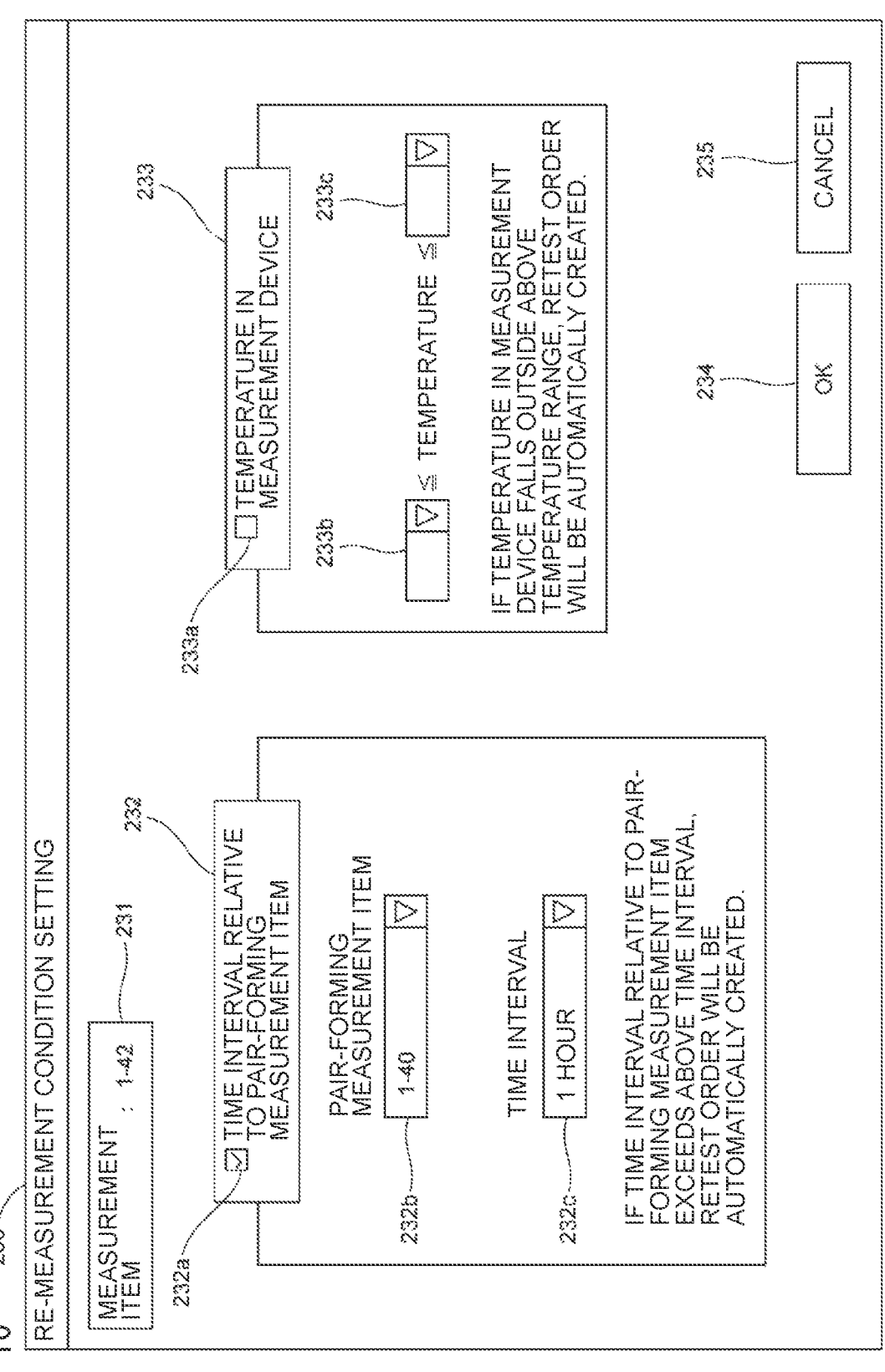
FIG. 10 schematically shows a configuration of a screen for performing additional setting regarding a measurement item, according to Embodiment 1.

Meanwhile, when the detail setting button 223 is operated in a state where the measurement item 1-42 is selected in FIG. 8, a screen 230 shown in FIG. 10 is displayed on the display unit 103.

FIG. 10 schematically shows a configuration of the screen 230, for performing additional setting regarding the measurement item 1-42, which is displayed on the display unit 103.

A measurement item name "1-42" is displayed in the measurement item display region 231 so as to make it understandable that the screen 230 is for setting related to the measurement item 1-42.

If the pair-forming measurement item and the time interval are set as shown in FIG. 9, when the measurement item 1-40 is selected as a pair-forming measurement item in the pull-down menu 232*b* in FIG. 10, the time interval in the pull-down menu 232*c* in FIG. 10 is automatically changed to the time interval having been set in FIG. 9. In contrast, if the pair-forming measurement item and the time interval are set as shown in FIG. 10, when the measurement item 1-42 is selected as a pair-forming measurement item in the pull-down menu 232*b* in FIG. 9, the time interval in the pull-down menu 232*c* in FIG. 9 is changed to the time interval having been set in FIG. 10. That is, the time intervals for the measurement items 1-40 and 1-42 can be set in either of the screens in FIGS. 9 and 10.

In the screen 230 related to the measurement item 1-42 in FIG. 10, the checkbox 233a is in an unchecked state in initial setting. The reason for this is because a temperature range necessary for guaranteeing the reliability of a measurement value does not need to be individually set for measurement of the measurement item 1-42. The temperature setting region 233 may be omitted in the screen 230 related to the measurement item 1-42.

Figure 11:
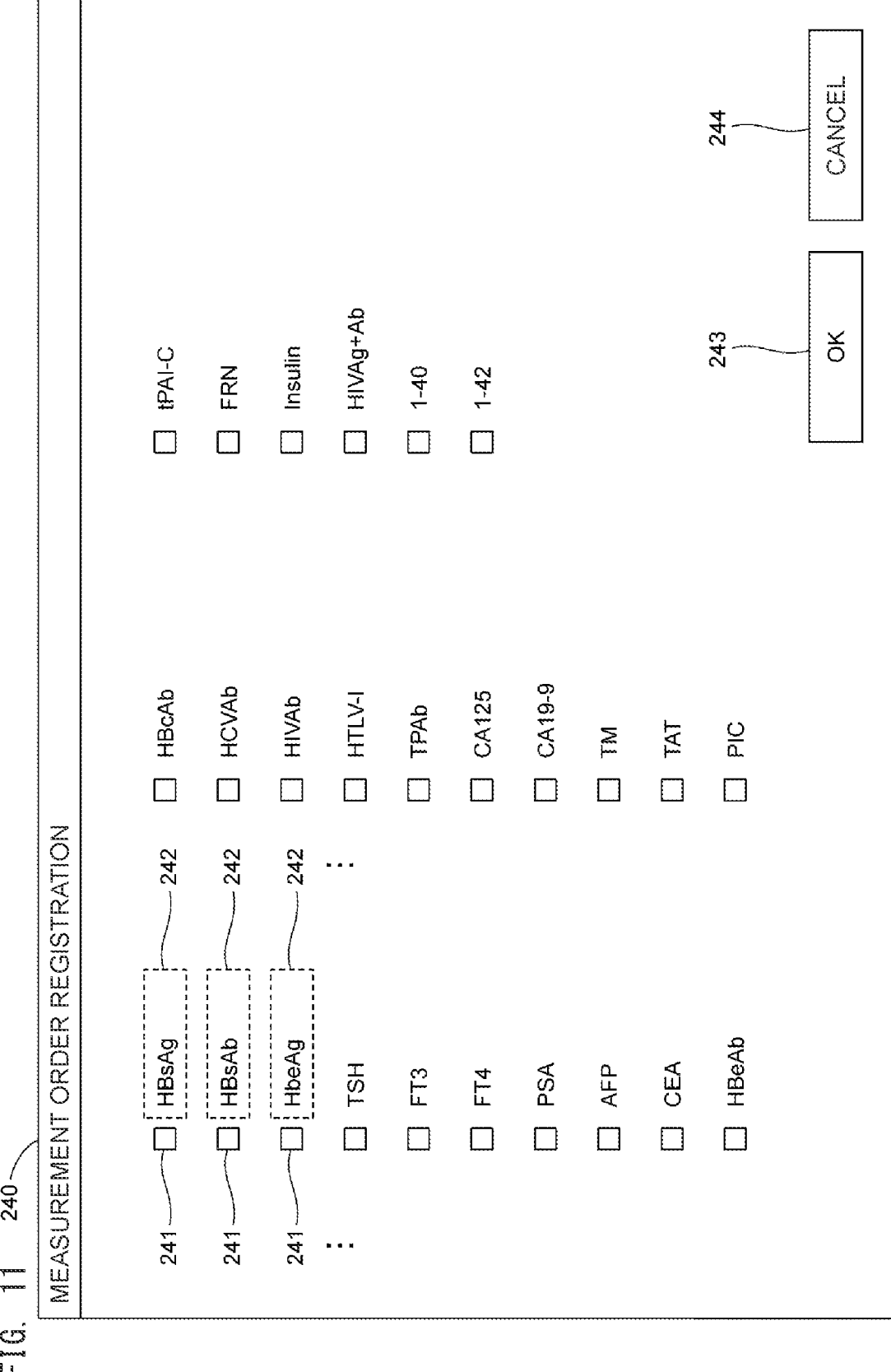
FIG. 11 schematically shows a configuration of a screen for allowing an operator to register a measurement order.

FIG. 11 schematically shows a configuration of a screen 240, for allowing an operator to register a measurement order, which is displayed on the display unit 103.

The screen 240 is displayed through operation, of the order registration button 205 of the screen 200 in FIG. 3, performed by an operator via the input unit 104. The screen 240 includes checkboxes 241, item display regions 242, an OK button 243, and a cancel button 244. The checkboxes 241 and the item display regions 242 are displayed so as to correspond to each other in a one-to-one relationship.

When an operator operates the input unit 104 so as to check off any of the checkboxes 241 and operates the OK button 243, a measurement item corresponding to the checkbox 241 is registered in a measurement order. As for a calculation item, if all measurement items necessary for obtaining the calculation item are registered, the calculation item is automatically registered in the measurement order.

Figure 18:
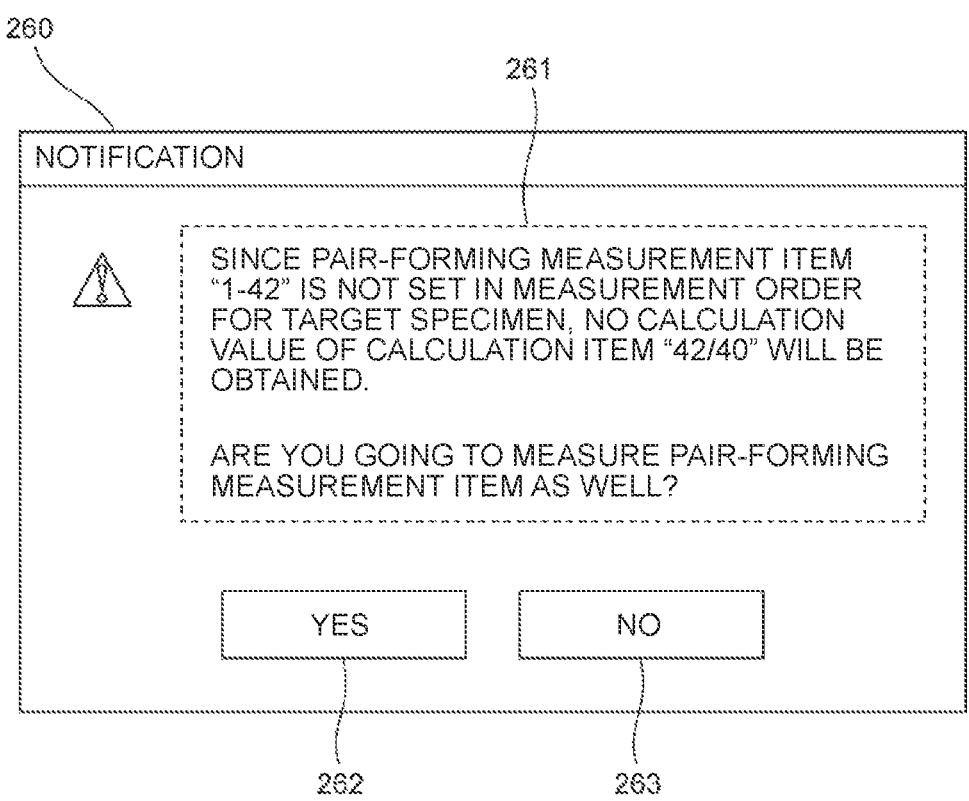
FIG. 18 schematically shows a configuration of a notification screen according to Embodiment 1.

When an operator checks off the checkbox 241 for one of the measurement items 1-40 and 1-42 and operates the OK button 243, a message that urges registration of another one of the measurement items in the measurement order is displayed on the display unit 103 as shown in FIG. 18 described later. Alternatively, when an operator checks off the checkbox 241 for one of the measurement items 1-40 and 1-42 and operates the OK button 243, error information indicating that the measurement order has failed to be registered may be displayed on the display unit 103.

FIG. 12 schematically shows a configuration of a modification of the screen 240, for allowing an operator to register a measurement order, which is displayed on the display unit 103.

A screen 240a for registering a measurement order is different from the screen 240 in that the calculation item AB42/40 is displayed instead of the measurement items 1-40 and 1-42. When an operator checks off the checkbox 241 for the calculation item AB42/40 and operates the OK button 243, the measurement items 1-40 and 1-42 which are measurement items necessary for obtaining the calculation item AB42/40 are registered in the measurement order.

Figure 13:
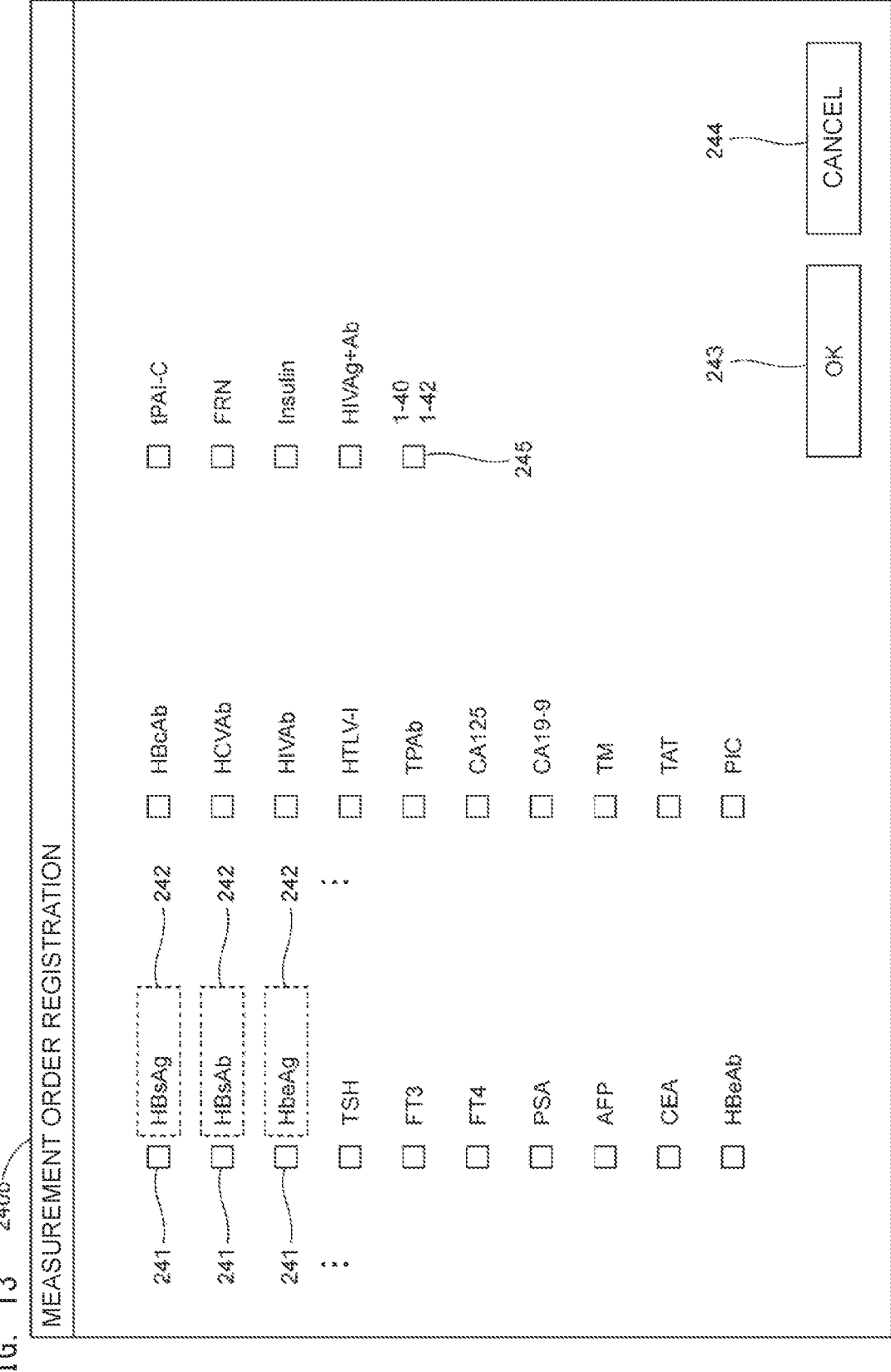
FIG. 13 schematically shows a configuration of another modification of the screen for allowing an operator to register a measurement order.

FIG. 13 schematically shows a configuration of another modification of the screen 240, for allowing an operator to register a measurement order, which is displayed on the display unit 103.

A screen 240b for registering a measurement order is different from the screen 240 in that a checkbox 245 corresponding to both the measurement items 1-40 and 1-42 is displayed. When an operator checks off the checkbox 245 and operates the OK button 243, the measurement items 1-40 and 1-42 are registered in the measurement order.

Figure 14:
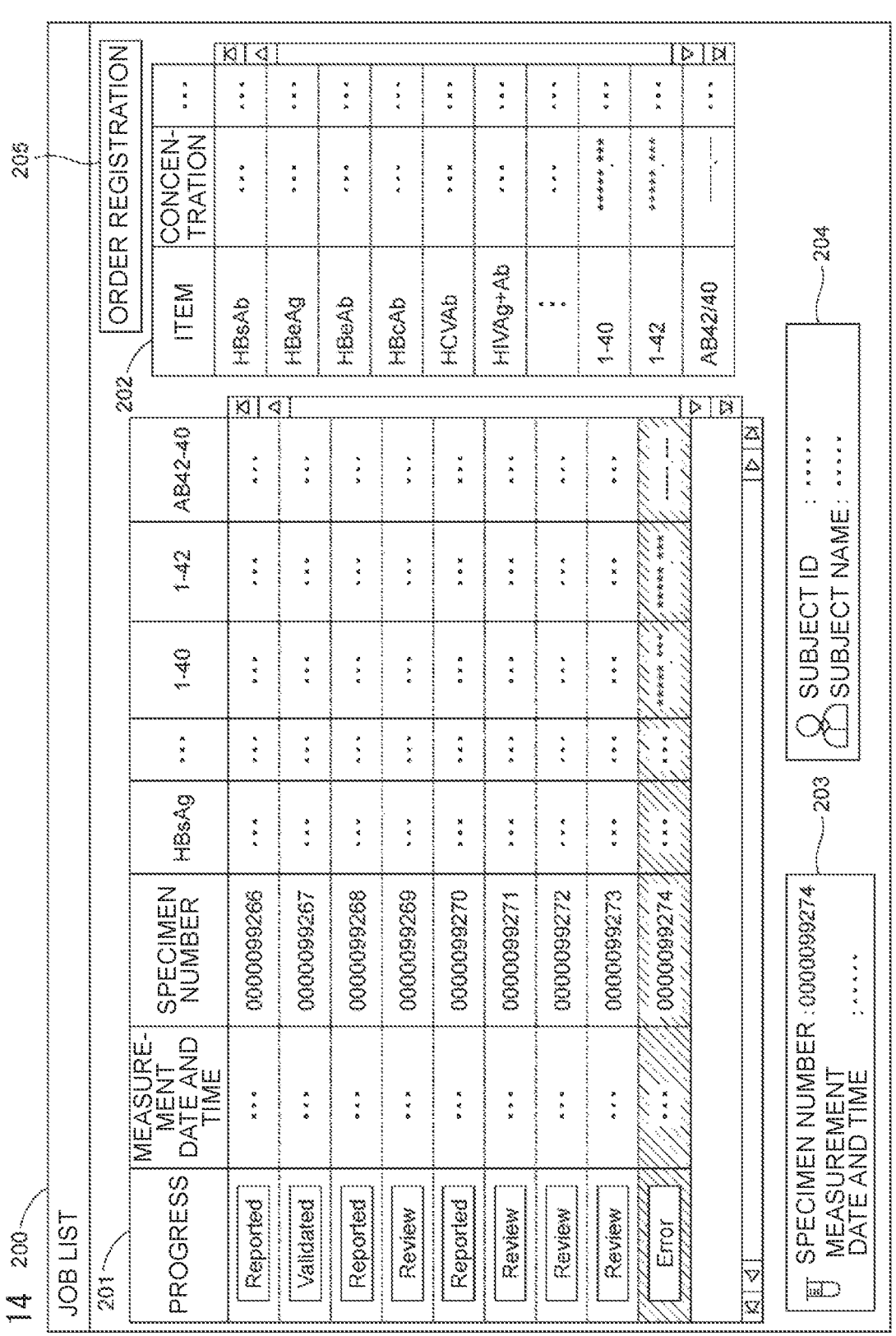
FIG. 14 schematically shows a configuration of a screen displaying a post-measurement job list, according to Embodiment 1.

FIG. 14 schematically shows a configuration of a screen 200, displaying a post-measurement job list, which is displayed on the display unit 103.

The screen 200 in FIG. 14 indicates a state where measurements and analyses for all the jobs having been set in the screen 200 in FIG. 3 have been ended. In measurement items that have been checked off in each of the jobs in the job list display region 201 in FIG. 3 and that have been normally measured, measurement values are displayed instead of the check marks. In the item of progress and the item of measurement date and time in the job list display region 201, a state of the job and the date and time of execution of the measurement are respectively displayed. In the item of progress in FIG. 14, a term "Reported" indicating that the measurement values have been outputted to a host computer, a printer for measurement value printing, or the like and that the job has been completed, a term "Validated" indicating that the measurement values have been approved, a term "Review" indicating that the measurement values need to be reviewed, a term "Error" indicating that the measurement has failed, or the like is displayed.

In an example shown in FIG. 14, the job selected on the lowermost row is in a state where measurement has failed. Specifically, the measurement items other than the measurement items 1-40 and 1-42 are each in a state where a measurement has been normally performed, and a measurement value has been obtained. However, regarding the measurement items 1-40 and 1-42, "***.*" indicating a measurement error is displayed as a measurement value of each of the measurement items 1-40 and 1-42 since the time interval between measurements of the measurement items 1-40 and 1-42 exceeds the time interval (1 hour) shown in FIGS. 9 and 10. In addition, "-----.---" is displayed as a calculation value of the calculation item AB42/40 since no calculation has been performed. Accordingly, in the detail display region 202 as well, the same measurement values and the like as those in the job list display region 201 are displayed. "•••" displayed in each of measurement items HBsAb, HBeAg, and the like representatively indicates that the obtained measurement value is displayed as a numerical value.

Figure 15:
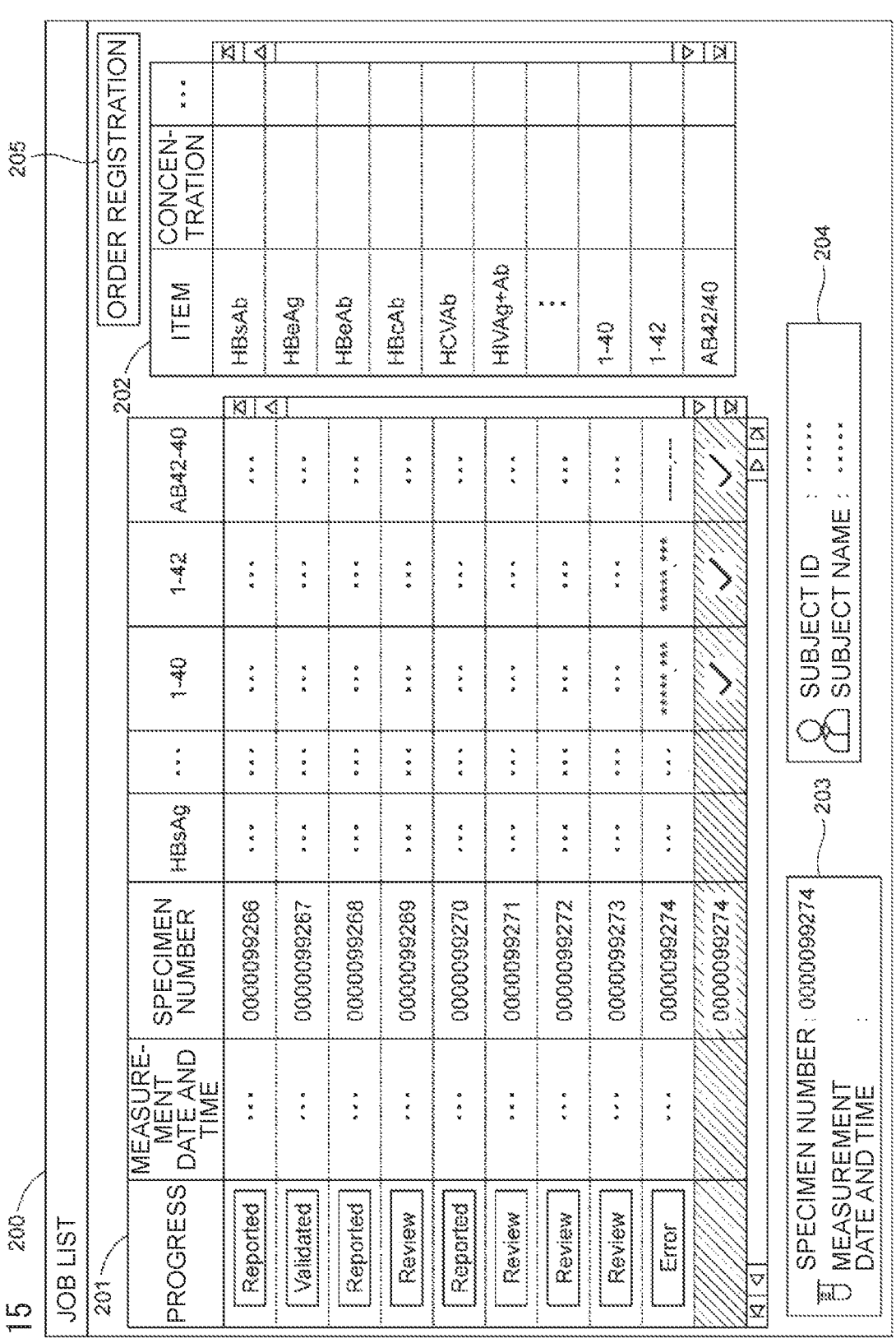
FIG. 15 schematically shows a configuration of the screen displaying the post-measurement job list, according to Embodiment 1.

As described above, if no appropriate calculation value has been obtained in the calculation item AB42/40, a measurement order for measuring the measurement items 1-40 and 1-42 again is automatically generated for the corresponding specimen as shown in FIG. 15.

FIG. 15 schematically shows a configuration of the screen 200, related to the post-measurement job list, which is displayed on the display unit 103.

Since no measurement values of the measurement items 1-40 and 1-42 have been obtained, a measurement order including these two measurement items and the calculation item obtained from measurement values of these two measurement items is generated for the same specimen (specimen number "0000099274") as that corresponding to the immediately-above job in the screen 200 in FIG. 15 in order to perform re-measurements (also referred to as "retests") of these two measurement items.

Figure 16:
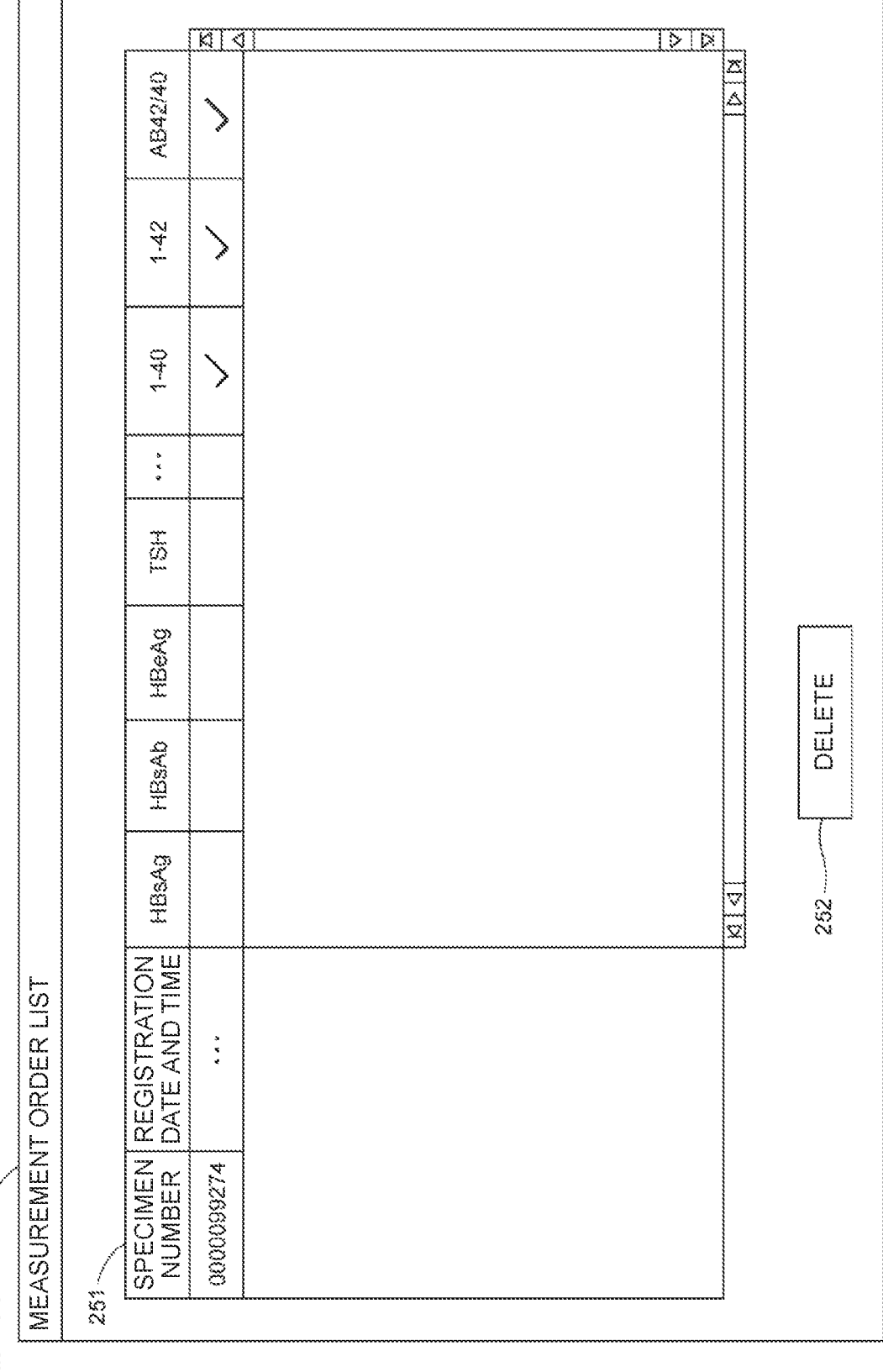
FIG. 16 schematically shows a configuration of a screen displaying a measurement order list related to a retest, according to Embodiment 1.

FIG. 16 schematically shows a configuration of a screen 250, displaying a measurement order list related to the retests, which is displayed on the display unit 103.

The screen 250 includes a measurement order list display region 251 and a deletion button 252.

The measurement order related to the retests is displayed in the measurement order list display region 251. The measurement order list display region 251 includes an item of specimen number and an item of registration date and time, and the plurality of measurement items and the calculation item. The registration date and time are the date and time on which the measurement order related to the retests is set. In the measurement items and the calculation item in the measurement order list display region 251, check marks are displayed if these measurement items are scheduled to be retested. An operator can ascertain, by referring to the measurement order list display region 251, what retest measurement order has been generated for which specimen. Accordingly, the operator can smoothly set the rack R holding a relevant container T onto the specimen transport unit 11 (see FIG. 1) again or can smoothly set the container T in any of the container placement portions 13*b* (see FIG. 1).

An operator performs an operation of selecting one row of the measurement order list display region 251 via the input unit 104, thereby being able to select a measurement order corresponding to the row. Then, the operator operates the deletion button 252 via the input unit 104, thereby being able to delete the measurement order corresponding to the row selected in the measurement order list display region 251. Consequently, if the operator determines that the specimen has degraded significantly, the operator can stop measurement in which the relevant container T is used.

Next, a process to be performed by the specimen analyzer 1 will be described.

In the following descriptions, the two measurement items having been set to be consecutively measured are referred to as a first measurement item and a second measurement item. An item for which a calculation value is calculated on the basis of a measurement value of the first measurement item and a measurement value of the second measurement item is simply referred to as a calculation item. In Embodiment 1, the first measurement item is 1-40, the second measurement item is 1-42, and the calculation item is AB42/40. Alternatively, the first measurement item may be 1-42, and the second measurement item may be 1-40.

Figure 17:
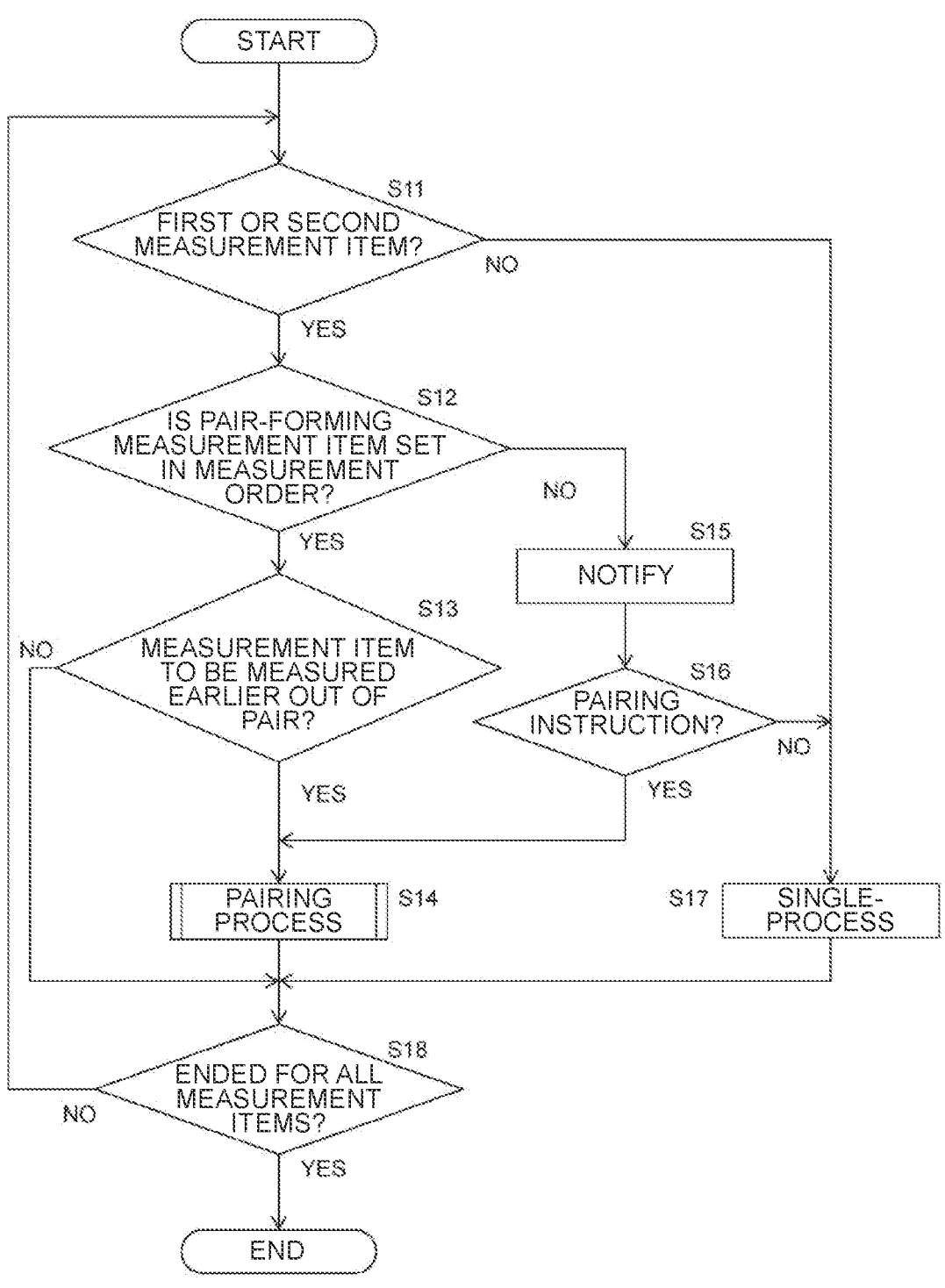
FIG. 17 is a flowchart showing a specimen analysis process according to Embodiment 1.

FIG. 17 is a flowchart showing a specimen analysis process.

The process shown in FIG. 17 is, in a state where a measurement order is registered, started by either of setting of a rack R holding a container T accommodating a specimen corresponding to the measurement order onto the specimen transport unit 11 (see FIG. 1) by an operator, and setting of the container T into any of the container placement portions 13*b* (see FIG. 1) by an operator. The process shown in FIG. 17 is performed per container T.

When the container T is positioned at the suction position of the specimen dispensing unit 12, the controller 101 of the control device 3 sequentially performs, on the basis of the measurement items having been set in the measurement order for the target specimen, determination in step S11 according to the measurement ranks having been set in the screen 210 in FIGS. 4 to 7.

In step S11, the controller 101 determines whether the determination-target measurement item is the first or second measurement item or is neither of the first and second measurement items. If the determination-target measurement item is the first or second measurement item, the controller 101 determines, in step S12, whether or not, regarding the measurement order for the target specimen, the corresponding pair-forming measurement item is set in the measurement order. That is, in step S12, if the determination target is the first measurement item, whether or not the second measurement item is scheduled to be measured is determined, and meanwhile, if the determination target is the second measurement item, whether or not the first measurement item is scheduled to be measured is determined.

If the pair-forming measurement item is present in the measurement order, the controller 101 determines, in step S13, whether or not the determination-target measurement item is a measurement item to be measured earlier out of the paired first and second measurement items. If the determination-target measurement item is a measurement item to be measured earlier, the controller 101 performs a pairing process (step S14) for consecutively performing measurements of the first and second measurement items in accordance with the measurement ranks having been set in any of FIGS. 4 to 7. Meanwhile, if the determination-target measurement item is a measurement item to be measured later, a measurement of the corresponding pair-forming measurement item has already been ended, and thus step S14 is skipped. The pairing process will be described later with reference to FIG. 19.

If the controller 101 determines, in step S12, that the pair-forming measurement item is not present in the measurement order, the controller 101 causes, in step S15, the display unit 103 to display a notification screen 260 shown in FIG. 18. As shown in FIG. 18, the notification screen 260 includes a notification region 261 for notifying an operator that the pair-forming measurement item is not set in the measurement order for the target specimen, and buttons 262 and 263. In an example shown in FIG. 18, an indication that no calculation value of the calculation item AB42/40 is to be obtained since the pair-forming measurement item 1-42 is not scheduled to be measured, is shown in the notification region 261 in the case where the determination-target measurement item is 1-40 and the pair-forming measurement item is 1-42. If the operator desires to measure the pair-forming measurement item, the operator operates the button 262 via the input unit 104. Meanwhile, if the operator does not desire to measure the pair-forming measurement item, the operator operates the button 263 via the input unit 104.

In step S16, the controller 101 determines which of the buttons has been operated in the notification screen 260 in FIG. 18. If the button 262 is operated, the controller 101 adds, to the measurement order, the measurement item to form a pair with the determination-target measurement item and advances the process to step S14. Meanwhile, if the button 263 is operated, the controller 101 advances the process to step S17 such that only a measurement of the determination-target measurement item out of the paired two measurement items is performed.

Figure 21:
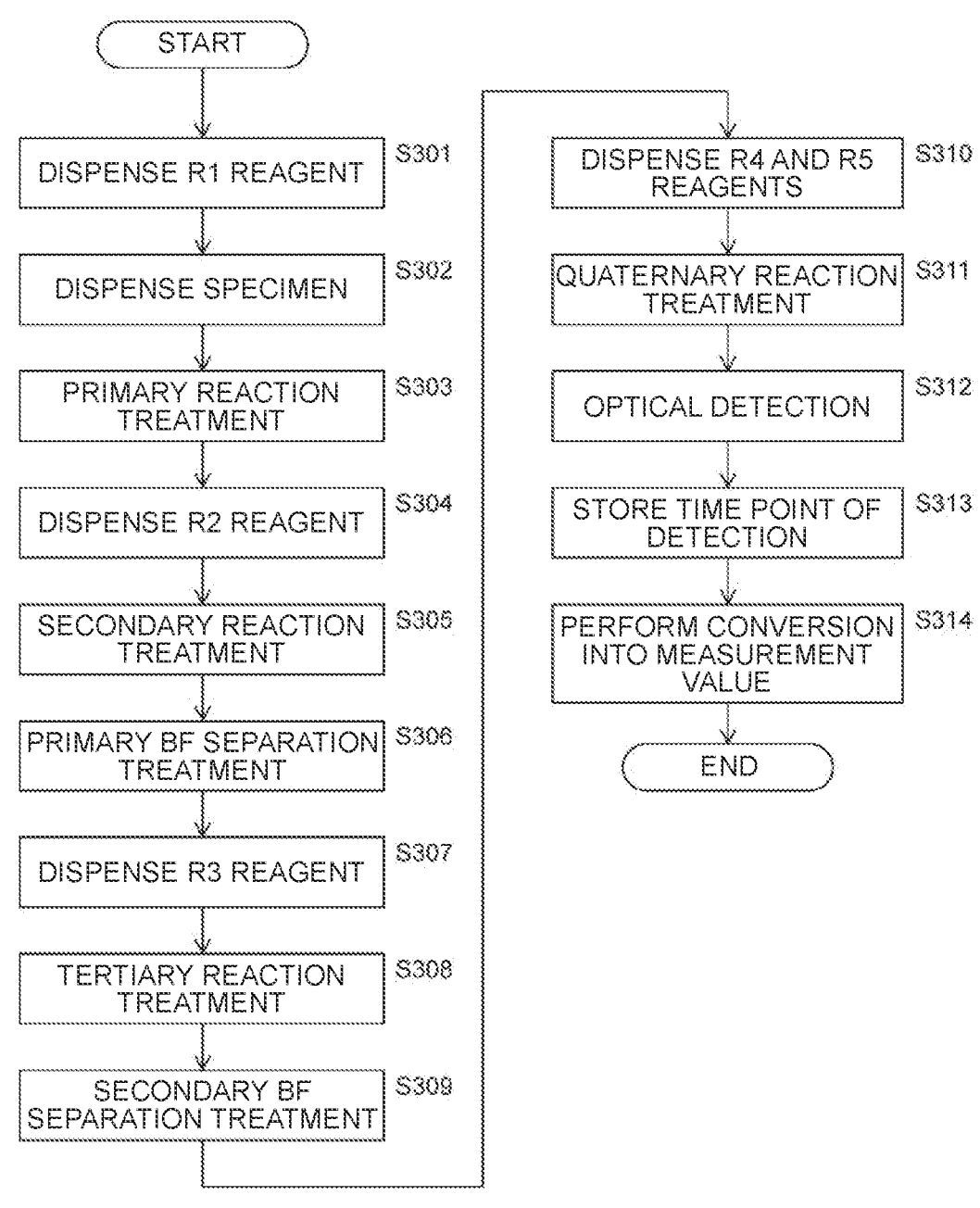
FIG. 21 is a flowchart showing a measurement process performed per measurement item, according to Embodiment 1.

If the controller 101 determines, in step S11, that the determination-target measurement item is neither of the first and second measurement items, the controller 101 performs a single-process in step S17 for performing a measurement of the determination-target measurement item. In the single-process in step S17, the controller 101 causes a measurement process (steps S301 to S314: FIG. 21) described later to be executed and causes the display unit 103 to display a measurement value having been obtained.

In step S18, the controller 101 determines, on the basis of the measurement order (including a retest order described later) for the target specimen, whether or not processes for all the measurement items have been ended. If the processes for all the measurement items have not been ended, the process is returned to step S11. Consequently, each measurement item having been set in the measurement order is regarded as a determination target according to the measurement rank thereof, and a process composed of steps S11 to S17 is performed. Meanwhile, if the processes for all the measurement items have been ended, the process in FIG. 17 is ended. Thereafter, if there is a subsequent container T, the process in FIG. 17 is performed consecutively on the subsequent container T.

Figure 19:
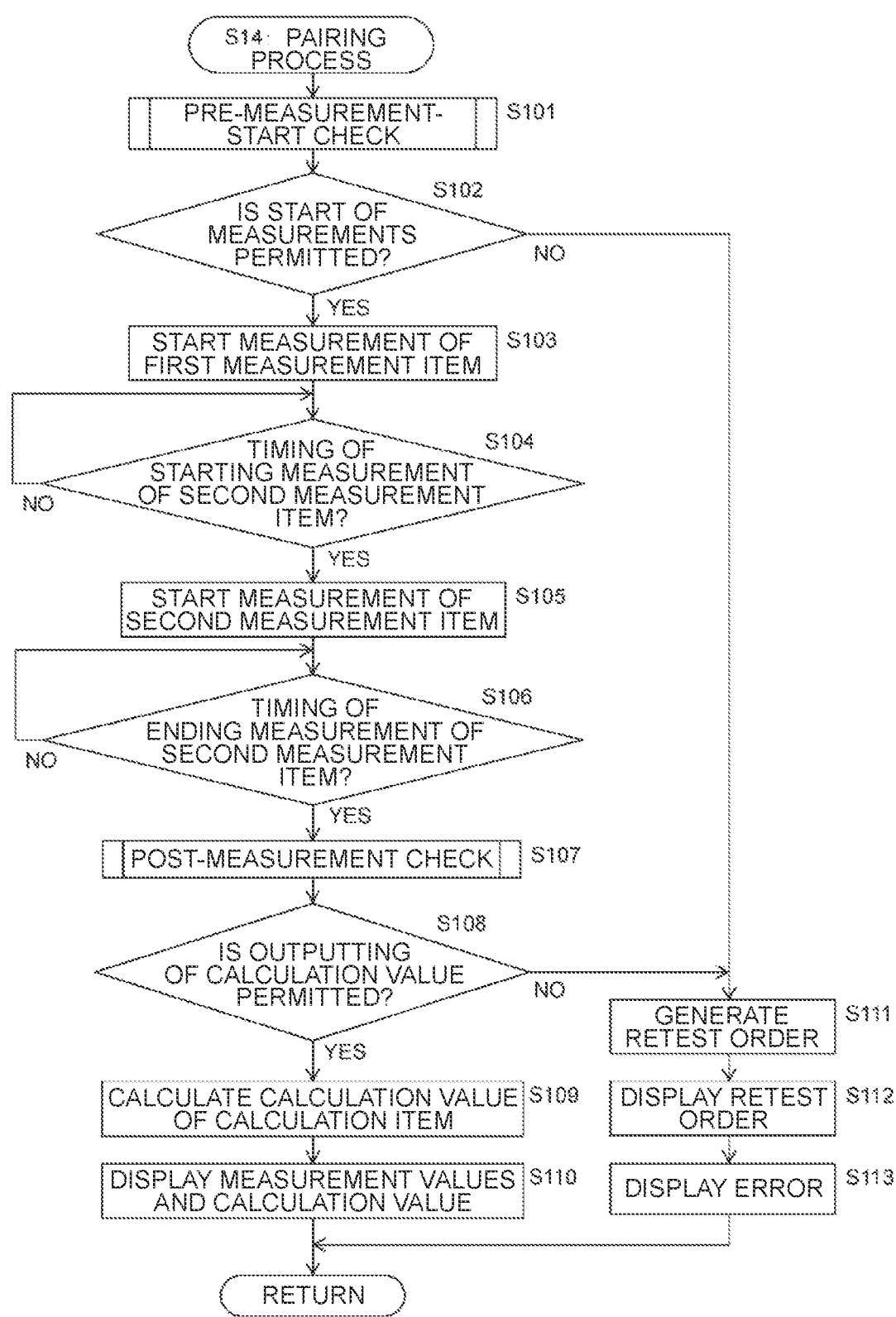
FIG. 19 is a flowchart showing a pairing process according to Embodiment 1.

FIG. 19 is a flowchart showing the pairing process in step S14 in FIG. 17.

In step S101, the controller 101 performs a process of a pre-measurement-start check. In the process of the pre-measurement-start check, the controller 101 determines whether or not a time difference between a measurement of the first measurement item and a measurement of the second measurement item is to be equal to or shorter than a predetermined time if measurements of the first and second measurement items are executed. If the controller 101 determines, in the process of the pre-measurement-start check, that the time difference is not to be equal to or shorter than the predetermined time, the controller 101 prohibits start of measurements of both the first measurement item and the second measurement item as described later.

Figure 20:
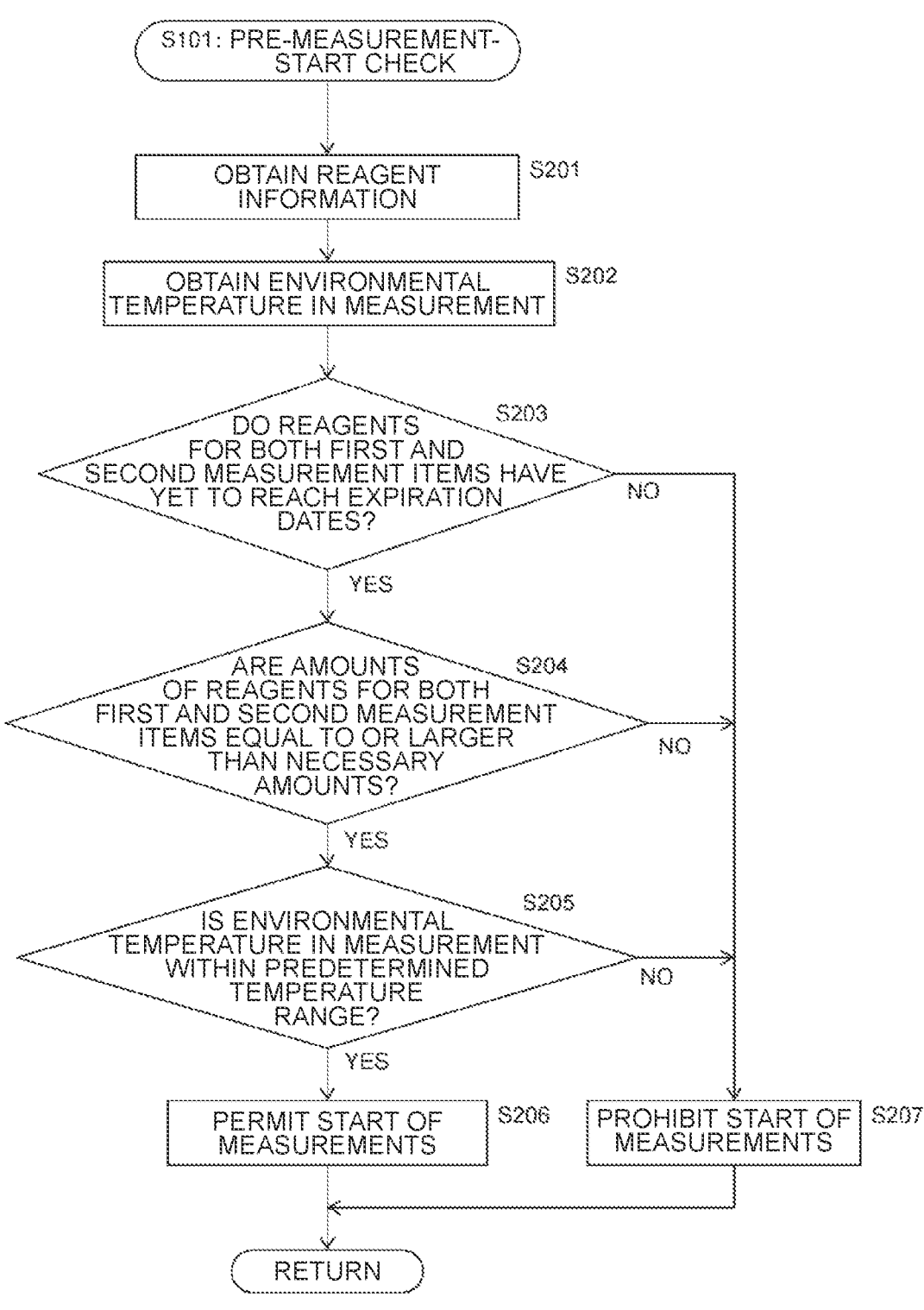
FIG. 20 is a flowchart showing a process of a pre-measurement-start check according to Embodiment 1.

FIG. 20 is a flowchart showing the process of the pre-measurement-start check in FIG. 19.

In step S201, the controller 101 obtains, from the storage unit 102, reagent information to be used for measurements of the first and second measurement items. Reagent information (an expiration date of each reagent, a remaining test number of the reagent, a remaining amount of the reagent, or the like) to be used for measurements of all the measurement items to be performed by the measurement device 2 is prestored in the storage unit 102. The controller 101 thoroughly updates, in accordance with an exchange of the reagent containers and consumptions of the reagents, the reagent information stored in the storage unit 102. Subsequently, in step S202, the controller 101 obtains an environmental temperature in measurement from the temperature sensor 32 (see FIG. 1).

In step S203, the controller 101 determines, on the basis of the reagent information obtained in step S201, whether or not reagents to be used for measurements of the first and second measurement items have yet to reach respective expiration dates.

If the reagents have yet to reach the respective expiration dates, the controller 101 determines, in step S204, whether or not remaining amounts of the reagents to be used for measurements of the first and second measurement items are equal to or larger than necessary amounts for measurements of the first and second measurement items, respectively, on the basis of the reagent information obtained in step S201. In step S204, for each of the measurement items, if the remaining test number for the reagent accommodated in a target reagent container is one or more times, the controller 101 determines that a necessary amount of the reagent is present in the target reagent container. Alternatively, for each of the measurement items, if the remaining amount of the reagent accommodated in a target reagent container is equal to or larger than a necessary amount for one time of measurement, the controller 101 may determine that a necessary amount of the reagent is present in the target reagent container.

If at least necessary amounts of the reagents are present, the controller 101 determines, in step S205, whether or not the environmental temperature in measurement obtained in step S202 is within a predetermined temperature range. The predetermined temperature range is the temperature range having been set in the temperature setting region 233 in FIG. 9.

If the environmental temperature is within the predetermined temperature range, the controller 101 permits start of measurements of the first and second measurement items in step S206. Meanwhile, if a result of the determination in any of steps S203 to S205 is NO, the controller 101 prohibits start of measurements of the first and second measurement items in step S207. Consequently, the process of the pre-measurement-start check is ended.

With reference back to FIG. 19, the controller 101 determines, in step S102, whether or not start of measurements of the first and second measurement items has been permitted in the process of the pre-measurement-start check in step S101. If start of measurements of the first and second measurement items has been permitted, the controller 101 causes measurements of the first and second measurement items to be performed consecutively in accordance with the measurement ranks having been set in the screen 210 in FIGS. 4 to 7. In an example shown in FIG. 19, a measurement of the first measurement item is performed before a measurement of the second measurement item.

In step S103, the controller 101 causes a measurement of the first measurement item to be started. Consequently, the controller 101 causes a measurement process (steps S301 to S314: see FIG. 21) described later to be executed for the first measurement item concurrently with the pairing process. Subsequently, in step S104, the controller 101 determines whether or not it has become possible to start a measurement of the second measurement item. In other words, the controller 101 determines whether or not a timing of starting a measurement of the second measurement item has come. Thus, the controller 101 suspends the process until it becomes possible to start a measurement of the second measurement item. For example, the controller 101 determines, when the measurement process for the first measurement item advances to a predetermined step (for example, step S303 in FIG. 21), that it has become possible to start a measurement of the second measurement item. If it has become possible to start a measurement of the second measurement item, the controller 101 causes a measurement of the second measurement item to be started in step S105. Consequently, the controller 101 causes the measurement process (steps S301 to S314: see FIG. 21) described later to be executed for the second measurement item concurrently with the pairing process.

FIG. 21 is a flowchart showing the measurement process performed per measurement item.

The measurement process shown in FIG. 21 is applicable to not only each of a measurement of the first measurement item and a measurement of the second measurement item but also a measurement of another measurement item (single-process in FIG. 17). Each of steps in FIG. 21 is performed through control of the corresponding unit of the measurement device 2 by the controller 101.

In step S301, the R1 reagent is dispensed in a cuvette C having been set in any of the holding portions 18c. In step S302, the specimen is dispensed in the above cuvette C. In step S303, the primary reaction unit 18 performs the primary reaction treatment on the specimen and the R1 reagent in the above cuvette C. In step S304, the R2 reagent is dispensed in the above cuvette C. In step S305, the primary reaction unit 18 performs the secondary reaction treatment on the specimen and the R1 and R2 reagents in the above cuvette C. In step S306, the primary BF separation unit 22 performs the primary BF separation treatment in which the R1 reagent containing an unreacted capture antibody is removed from inside the above cuvette C.

In step S307, the R3 reagent is dispensed in the above cuvette C. In step S308, the secondary reaction unit 24 performs the tertiary reaction treatment on the specimen and the R1 to R3 reagents in the above cuvette C. In step S309, the secondary BF separation unit 27 performs the secondary BF separation treatment in which the R3 reagent containing an unreacted labeled antibody is removed from inside the above cuvette C.

In step S310, the R4 reagent and the R5 reagent are dispensed in the above cuvette C. In step S311, the secondary reaction unit 24 performs the quaternary reaction treatment on the specimen and the R1 to R5 reagents in the above cuvette C. In step S312, the detector 30 performs an optical detection process of detecting light generated from the specimen and the R1 to R5 reagents in the above cuvette C. In step S313, the controller 101 stores, in the storage unit 102, a time point at which the optical detection process has been ended. Step S313 may be a step that is executed only for measurements of the first and second measurement items and that is not executed for measurements of the other measurement items. Thereafter, in step S314, a process of converting the amount of the light detected in step S312 into a measurement value (the concentration of the protein to be measured) is performed.

With reference back to FIG. 19, in step S106, the controller 101 determines whether or not a timing of ending step S314 for each of the first and second measurement items has come. In other words, the controller 101 determines whether or not a timing of ending the measurements of the first and second measurement items has come. If the controller 101 determines that the timing of ending the measurements of the first and second measurement items has come, the controller 101 performs a process of a post-measurement check in step S107. In the process of the post-measurement check, the controller 101 determines whether or not the time difference between the measurement of the first measurement item and the measurement of the second measurement item is equal to or shorter than the predetermined time. If the controller 101 determines, in the process of the post-measurement check, that the time difference is not equal to or shorter than the predetermined time, the controller 101 prohibits outputting of a calculation value of the calculation item based on the measurement values of the first and second measurement items as described later.

Figure 22:
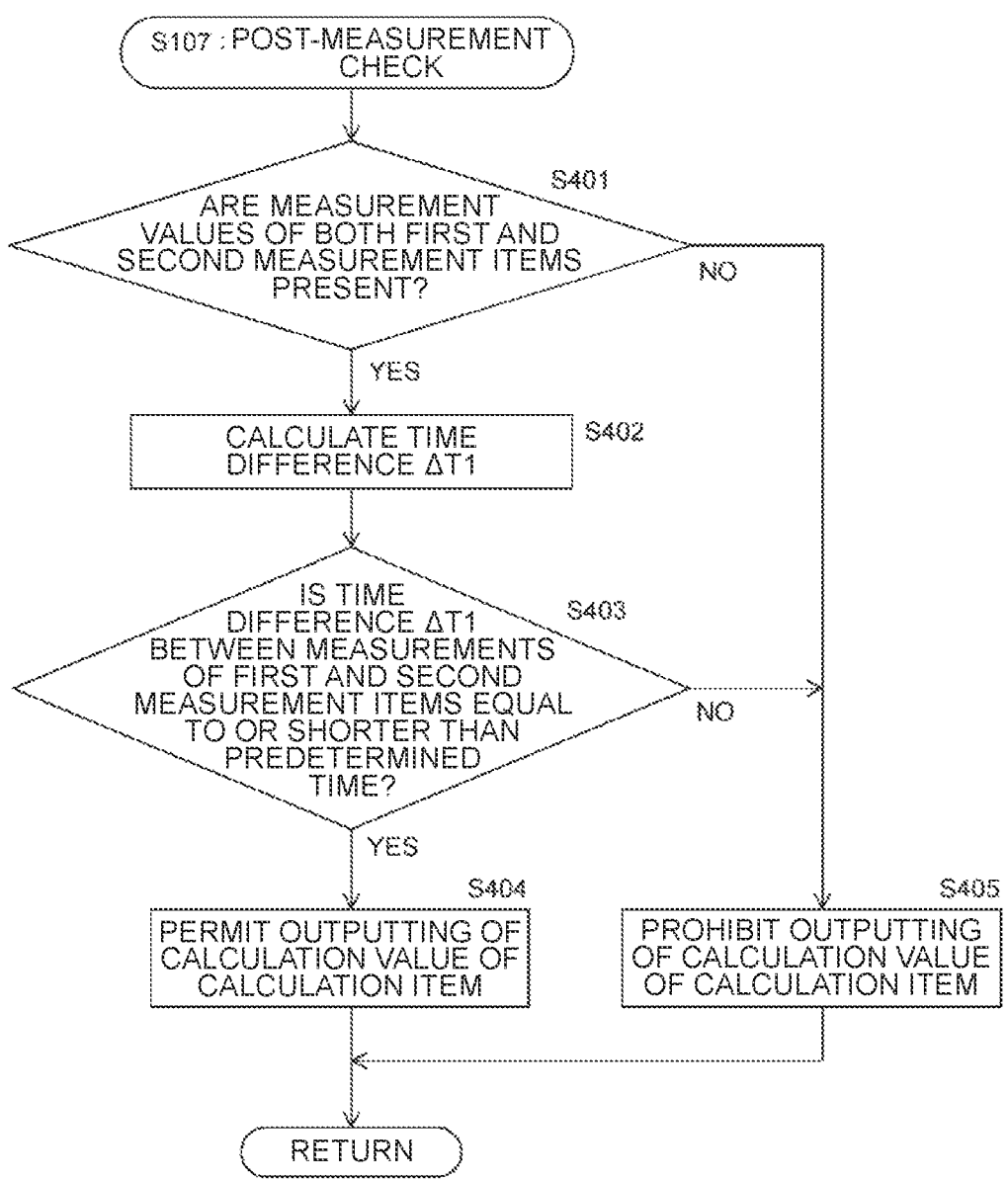
FIG. 22 is a flowchart showing a process of a post-measurement check according to Embodiment 1.

FIG. 22 is a flowchart showing the process of the post-measurement check.

In step S401, the controller 101 determines whether or not the measurement values of both the first and second measurement items are present. In Embodiment 1, the measurement values of both the first and second measurement items have been normally obtained before the process of the post-measurement check is executed. However, if an error in, for example, dispensing any of the specimen and the reagents occurs in either of the measurement of the first measurement item and the measurement of the second measurement item, no measurement value is obtained for the measurement item regarding which the error in dispensing has occurred. If a measurement value of at least one of the first and second measurement items fails to be obtained in this manner, a result of the determination in step S401 is NO.

If the measurement values of both the first and second measurement items are present, the controller 101 reads out, from the storage unit 102, the detection time points stored in step S313 in FIG. 21 during the measurements of the first and second measurement items and calculates the difference between the two detection time points as a time difference $\Delta T1$ between the measurement of the first measurement item and the measurement of the second measurement item in step S402.

Figure 23:
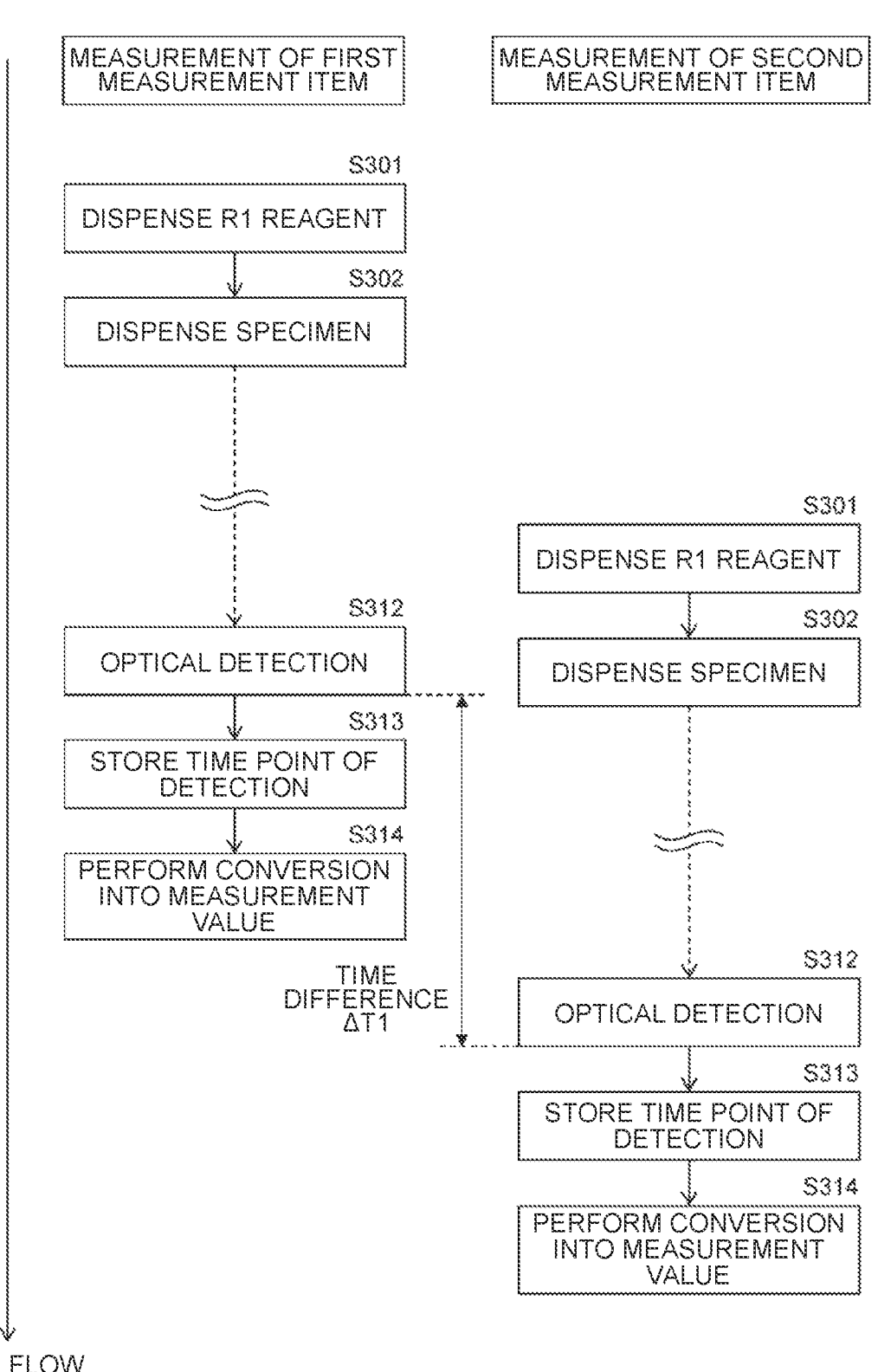
FIG. 23 is a time chart showing a measurement of a first measurement item and a measurement of a second measurement item, according to Embodiment 1.

FIG. 23 is a time chart showing a measurement of the first measurement item and a measurement of the second measurement item.

If the measurement rank of the second measurement item is subsequent to that of the first measurement item, a measurement of the second measurement item is suspended until it becomes possible to start a measurement of the second measurement item after a measurement of the first measurement item is started. Thus, as shown in FIG. 23, the timing of starting measurement differs between the first measurement item and the second measurement item. As a result, the detection time points stored in step S313 also differ from each other. As shown in FIG. 23, the time difference $\Delta T1$ calculated in step S402 in FIG. 22 is the difference between the timing at which optical detection in step S312 during the measurement of the first measurement item has been ended and the timing at which optical detection in step S312 during the measurement of the second measurement item has been ended.

With reference back to FIG. 22, in step S403, the controller 101 determines whether or not the time difference $\Delta T1$ obtained in step S402 is equal to or shorter than the predetermined time. The predetermined time to be used for determination in step S403 is the time interval having been set with the pull-down menu 232c in FIGS. 9 and 10.

In Embodiment 1, the measurements of the first and second measurement items are performed consecutively, and thus, ordinarily, the time difference $\Delta T1$ between the measurements of the first and second measurement items is equal to or shorter than the predetermined time. However, there are cases where a measurement out of the measurements of the first and second measurement items is temporarily interrupted, and then the measurement is restarted. For example, there is a case where the environmental temperature in the above measurement device 2 falls outside the predetermined range during the measurement of the first measurement item. In this case, the measurement is temporarily interrupted, and an operator takes a countermeasure such as reduction of the temperature of the room in which the specimen analyzer 1 is installed. When the environmental temperature in the measurement device 2 falls within the predetermined range as a result of the countermeasure, the measurement of the first measurement item is restarted. At this time, if a measurement value of the second measurement item has already been obtained before the measurement of the first measurement item, the time difference $\Delta T1$ between the measurements of the first and second measurement items might exceed the predetermined time. In this case, a result of the determination in step S403 is NO.

If the time difference $\Delta T1$ is equal to or shorter than the predetermined time, the controller 101 permits outputting of a calculation value of the calculation item based on the measurement values of the first and second measurement items in step S404. In Embodiment 1, the calculation value of the calculation item is a ratio obtained by dividing the measurement value of the second measurement item 1-42 by the measurement value of the first measurement item 1-40. Meanwhile, if the result of the determination in either step S401 or S403 is NO, the controller 101 prohibits outputting of a calculation value of the calculation item based on the measurement values of the first and second measurement items in step S405. Consequently, the process of the post-measurement check is ended.

With reference back to FIG. 19, in step S108, the controller 101 determines whether or not outputting of a calculation value of the calculation item is permitted in step S404 in FIG. 22. If outputting of a calculation value is permitted, the controller 101 calculates a calculation value of the calculation item in step S109. Thereafter, in step S110, the controller 101 causes the display unit 103 to display the measurement values of the first and second measurement items and the calculation value of the calculation item. Consequently, for example, the measurement values of the first and second measurement items and the calculation value of the calculation item are displayed in the screen 200 displaying a job list in FIG. 14, as shown in any of the jobs having progresses that are not indicated as errors.

Although the displaying of the screen 200 in step S110 may be automatically executed after completion of step S109 or may be executed through input, of a display instruction, performed via the input unit 104 by an operator, it is preferable to automatically execute the displaying from the viewpoint of mitigating a burden of the operator.

Meanwhile, if start of measurements is prohibited in step S207 in FIG. 20 and if outputting of a calculation value of the calculation item is prohibited in step S405 in FIG. 22, the controller 101 generates a retest measurement order including the first and second measurement items and the calculation item in step S111. Then, in step S112, the controller 101 causes the display unit 103 to display the retest order. Through steps S111 and S112, a retest measurement order for the first and second measurement items and the calculation item (in Embodiment 1, the measurement items 1-40 and 1-42 and the calculation item AB42/40) is generated, and the screen 250 showing the retest order is displayed on the display unit 103 as shown in FIG. 16.

In addition, in step S113, the controller 101 causes the display unit 103 to display, in fields of the measurement values of the first and second measurement items and the calculation value of the calculation item, an indication that no appropriate measurement values have been obtained. Specifically, as shown in the lowermost row of the job list display region 201 and the detail display region 202 in FIG. 14, "***.*" indicating a measurement error is displayed in each of the fields of the measurement values of the measurement items 1-40 and 1-42 corresponding to the first and second measurement items, and "-----.--" indicating inability to perform calculation is displayed in the field of the calculation value of AB42/40 corresponding to the calculation item. Consequently, the pairing process shown in FIG. 19 is ended.

An operator can specify a retest-target specimen by referring to the retest order displayed in step S112. Thereafter, the operator sets a container T for the target specimen onto the specimen transport unit 11 or into any of the container placement portions 13*b*. Consequently, the process in FIG. 17 is performed again so that a measurement process for each of the measurement items having been set in the retest order is performed.

Modification 1 of Embodiment 1

Although whether or not the environmental temperature in measurement is within the predetermined temperature range is determined in the process of the pre-measurement-start check in Embodiment 1, the determination as to the environmental temperature in measurement may be performed during a measurement.

Figure 24:
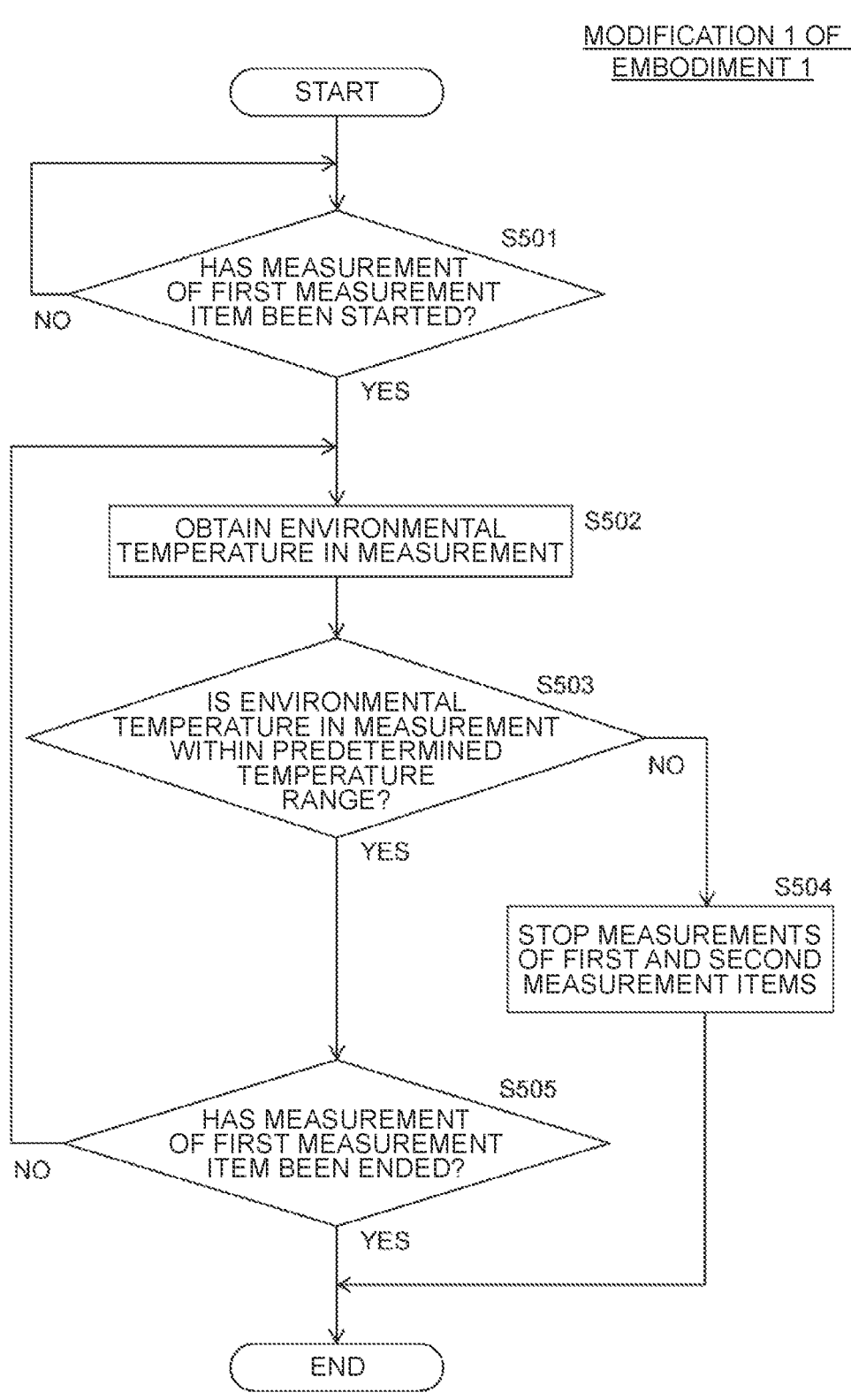
FIG. 24 is a flowchart showing a process for stopping a measurement in accordance with an environmental temperature, according to Modification 1 of Embodiment 1.

FIG. 24 is a flowchart showing a process for stopping a measurement in accordance with the environmental temperature, according to Modification 1 of Embodiment 1. In an example shown in FIG. 24, the first measurement item is the measurement item 1-40.

In step S501, the controller 101 determines whether or not a measurement of the first measurement item has been started. When a measurement of the first measurement item is started, the controller 101 obtains an environmental temperature in measurement from the temperature sensor 32 (see FIG. 1) in step S502. In step S503, the controller 101 determines whether or not the environmental temperature in measurement obtained in step S502 is within a predetermined temperature range. The predetermined temperature range is the temperature range having been set in the temperature setting region 233 in FIG. 9.

If the environmental temperature is outside the predetermined temperature range, the controller 101 stops not only the measurement of the first measurement item being executed but also a measurement of the second measurement item in step S504. In this case, no measurement values of the first and second measurement items are obtained. Thus, the result of the determination in step S401 in FIG. 22 is NO, and outputting of a calculation value of the calculation item is prohibited.

Meanwhile, if the environmental temperature is within the predetermined temperature range, the controller 101 determines, in step S505, whether or not the measurement of the first measurement item has been ended. If the measurement of the first measurement item has not been ended, the controller 101 returns the process to step S502 and repetitively performs a process composed of steps S502 to S504 at a predetermined time interval. Meanwhile, if the measurement of the first measurement item has been ended, the controller 101 ends the process in FIG. 24.

In this manner, if the determination as to the environmental temperature is performed during the measurement of the first measurement item, measurements can be swiftly stopped upon increase in the temperature after the measurement of the first measurement item is started. Consequently, the consumptions of reagents having been scheduled to be used can be reduced.

Modification 2 of Embodiment 1

Although determination as to the environmental temperature in measurement is performed during a measurement in Modification 1 of Embodiment 1, the environmental temperature obtained during a measurement may be stored, and determination as to the environmental temperature may be performed after the measurement.

Figure 25:
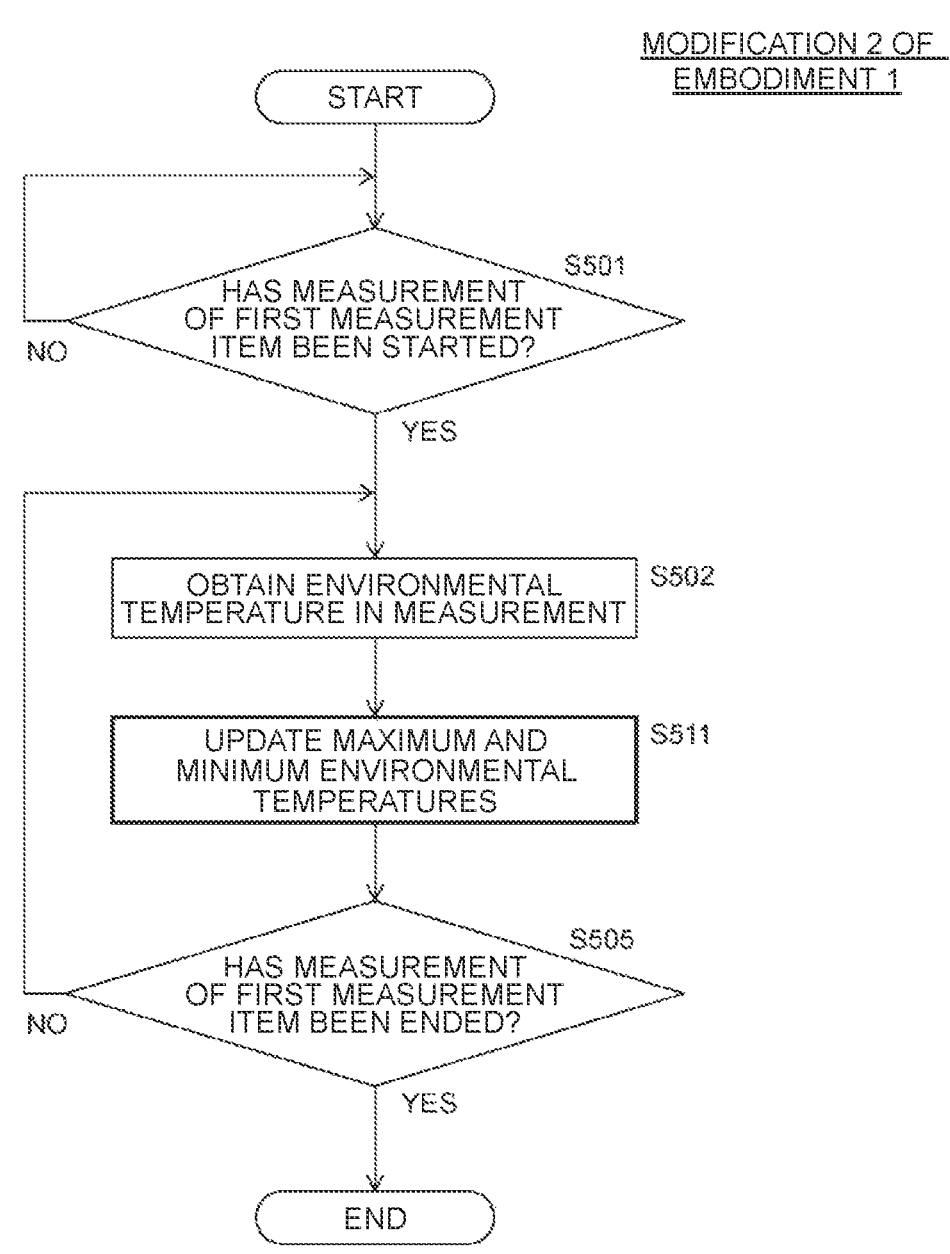
FIG. 25 is a flowchart showing a process of obtaining an environmental temperature, according to Modification 2 of Embodiment 1.

FIG. 25 is a flowchart showing a process of obtaining an environmental temperature, according to Modification 2 of Embodiment 1. In FIG. 25, steps S503 and S504 are omitted and step S511 is added, as compared to FIG. 24. Hereinafter, step S511 will be described.

In step S511, the controller 101 updates, on the basis of the environmental temperature obtained in immediately preceding step S502, maximum and minimum environmental temperatures stored in the storage unit 102. For example, if the obtained environmental temperature is higher than the maximum environmental temperature stored in the storage unit 102, the obtained environmental temperature is newly set as a maximum environmental temperature stored in the storage unit 102, and meanwhile, if the obtained environmental temperature is lower than the minimum environmental temperature stored in the storage unit 102, the obtained environmental temperature is newly set as a minimum environmental temperature stored in the storage unit 102. The maximum and minimum environmental temperatures out of the environmental temperature changing during the measurement of the first measurement item are stored in the storage unit 102 through the process in FIG. 25.

Figure 26:
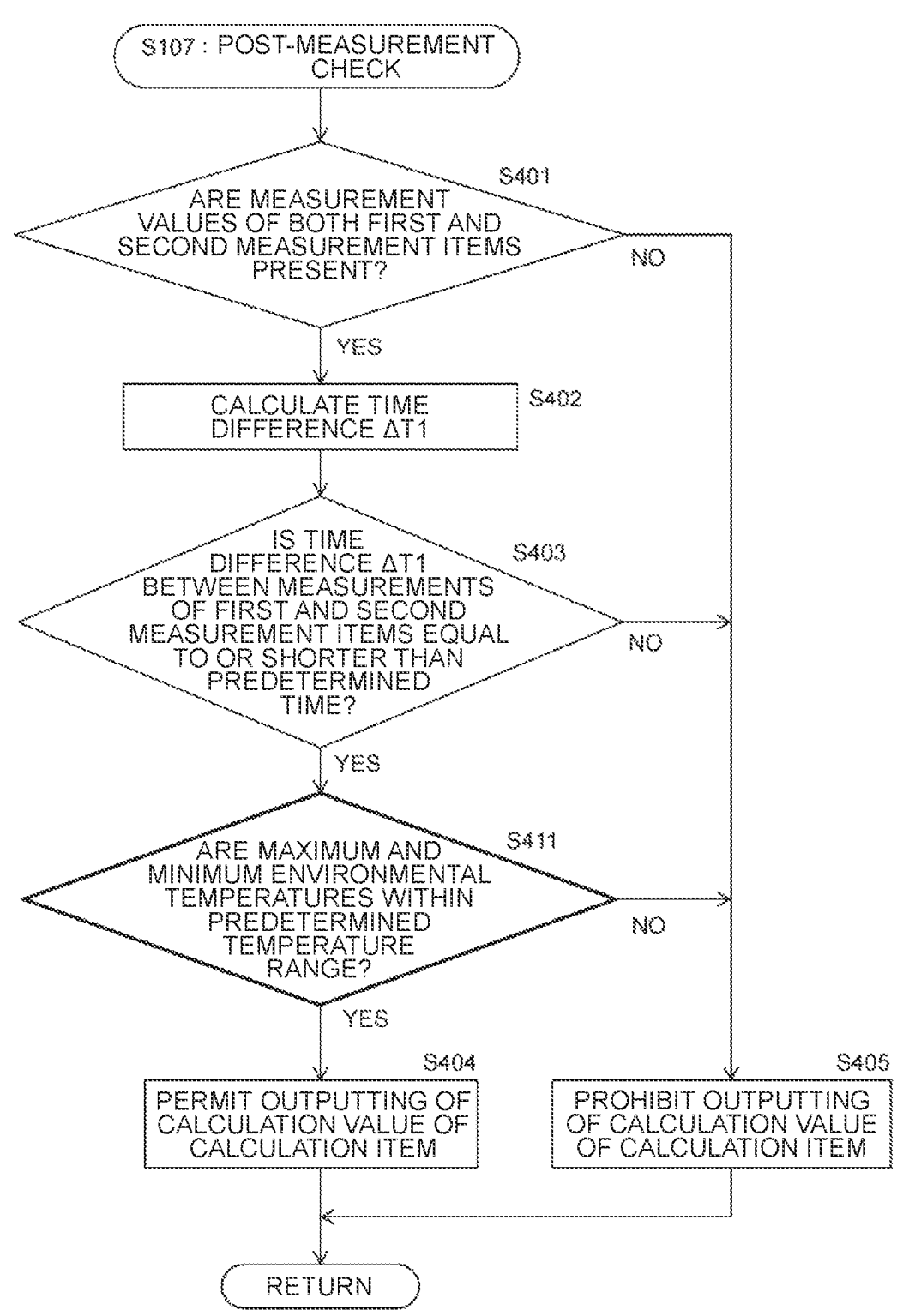
FIG. 26 is a flowchart showing a process of a post-measurement check according to Modification 2 of Embodiment 1.

FIG. 26 is a flowchart showing a process of a post-measurement check according to Modification 2 of Embodiment 1. In FIG. 26, step S411 is added between steps S403 and S404 as compared to FIG. 22. Hereinafter, step S411 will be described.

In step S411, the controller 101 determines whether or not the maximum and minimum environmental temperatures obtained through the process in FIG. 25 are within a predetermined temperature range. The predetermined temperature range is the temperature range having been set in the temperature setting region 233 in FIG. 9. If the maximum and minimum environmental temperatures are within the predetermined temperature range, the controller 101 permits outputting of a calculation value of the calculation item based on the measurement values of the first and second measurement items in step S404. Meanwhile, if a result of the determination in any of steps S401, S403, and S411 is NO, the controller 101 prohibits outputting of a calculation value of the calculation item based on the measurement values of the first and second measurement items in step S405.

Modification 3 of Embodiment 1

In Embodiment 1, the pre-measurement-start check is executed in FIG. 19. However, Embodiment 1 is not limited thereto, and the pre-measurement-start check does not have to be performed.

Figure 27:
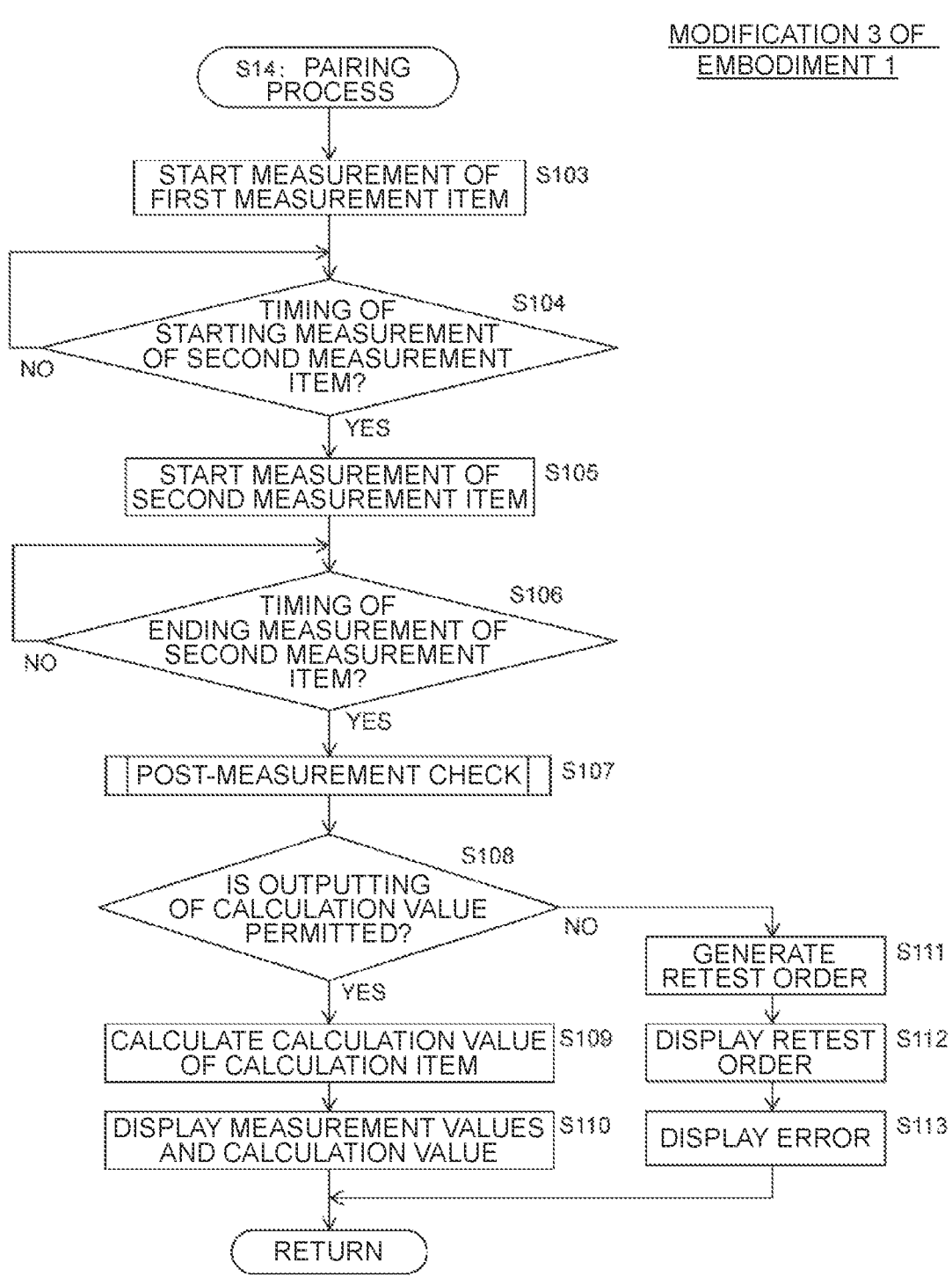
FIG. 27 is a flowchart showing a pairing process according to Modification 3 of Embodiment 1.

FIG. 27 is a flowchart showing a pairing process according to Modification 3 of Embodiment 1. In FIG. 27, steps S101 and S102 are omitted as compared to FIG. 19.

In Embodiment 1 or Modification 3 of Embodiment 1, reception of measurement ranks that allow the measurement items 1-40 and 1-42 to be consecutive as in the group 211b in FIGS. 5 and 7 may be omitted, and the measurement items may be received according to arbitrarily-selected measurement ranks. In addition, a process composed of steps S12, S15, and S16 in FIG. 17 may be omitted, and notification of the pair-forming measurement item in FIG. 18 does not have to be performed. In addition, a process composed of steps S111 and S112 in FIGS. 19 and 27 may be omitted, and a process of automatically registering the measurement items 1-40 and 1-42 in a retest order does not have to be performed. In this case, an operator causes the display unit 103 to display any of the screens 240, 240a, and 240b (see FIGS. 11 to 13) for registering an order and registers a retest order by operating the input unit 104.

That is, the controller 101 only has to execute at least one of: a process of receiving measurement items such that an interval between the two measurement items in FIGS. 4 to 7 becomes equal to or shorter than the predetermined time; the notification process in step S15 in the case where the measurement order includes only one of the measurement items; a process of the pre-measurement-start check in step S101; a process of the post-measurement check in step S107; and a process of generating a retest order in step S111.

Embodiment 2

In Embodiment 1, the time difference between a measurement of the first measurement item and a measurement of the second measurement item is the difference $\Delta T1$ between the time points at which the optical detection processes in step S312 have been ended. Meanwhile, in Embodiment 2, the time difference between a measurement of the first measurement item and a measurement of the second measurement item is a difference $\Delta T2$ between time points at which measurements have been started.

Figure 28:
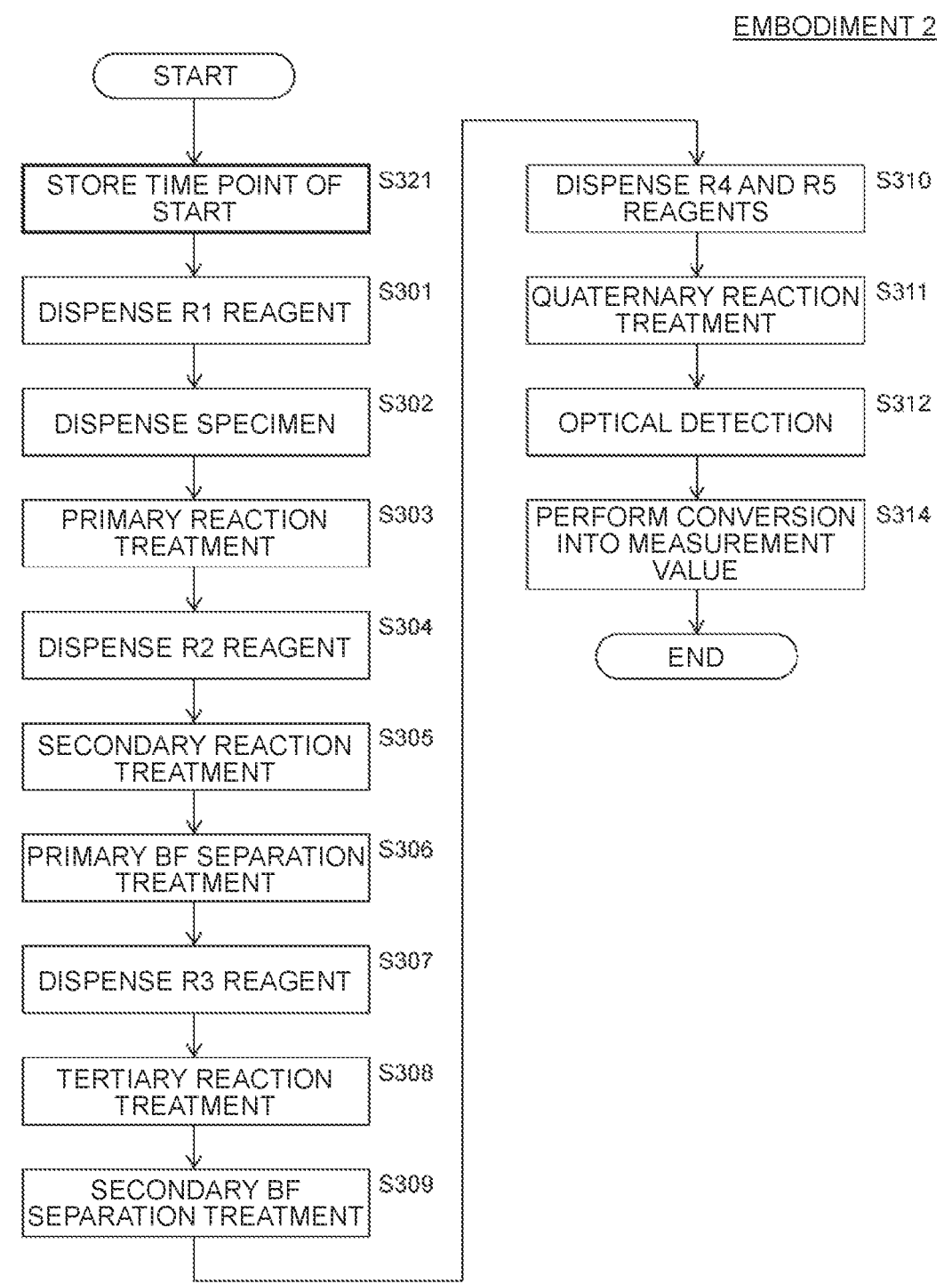
FIG. 28 is a flowchart showing a measurement process performed per measurement item, according to Embodiment 2.

FIG. 28 is a flowchart showing a measurement process performed per measurement item, according to Embodiment 2. In FIG. 28, step S313 is omitted and step S321 is added before step S301, as compared to FIG. 21. Hereinafter, step S321 will be described.

In step S321 immediately preceding execution of step S301, the controller 101 stores, in the storage unit 102, a time point at which the measurement has been started. Step S321 may be a step that is executed only for measurements of the first and second measurement items and that is not executed for measurements of the other measurement items.

Figure 29:
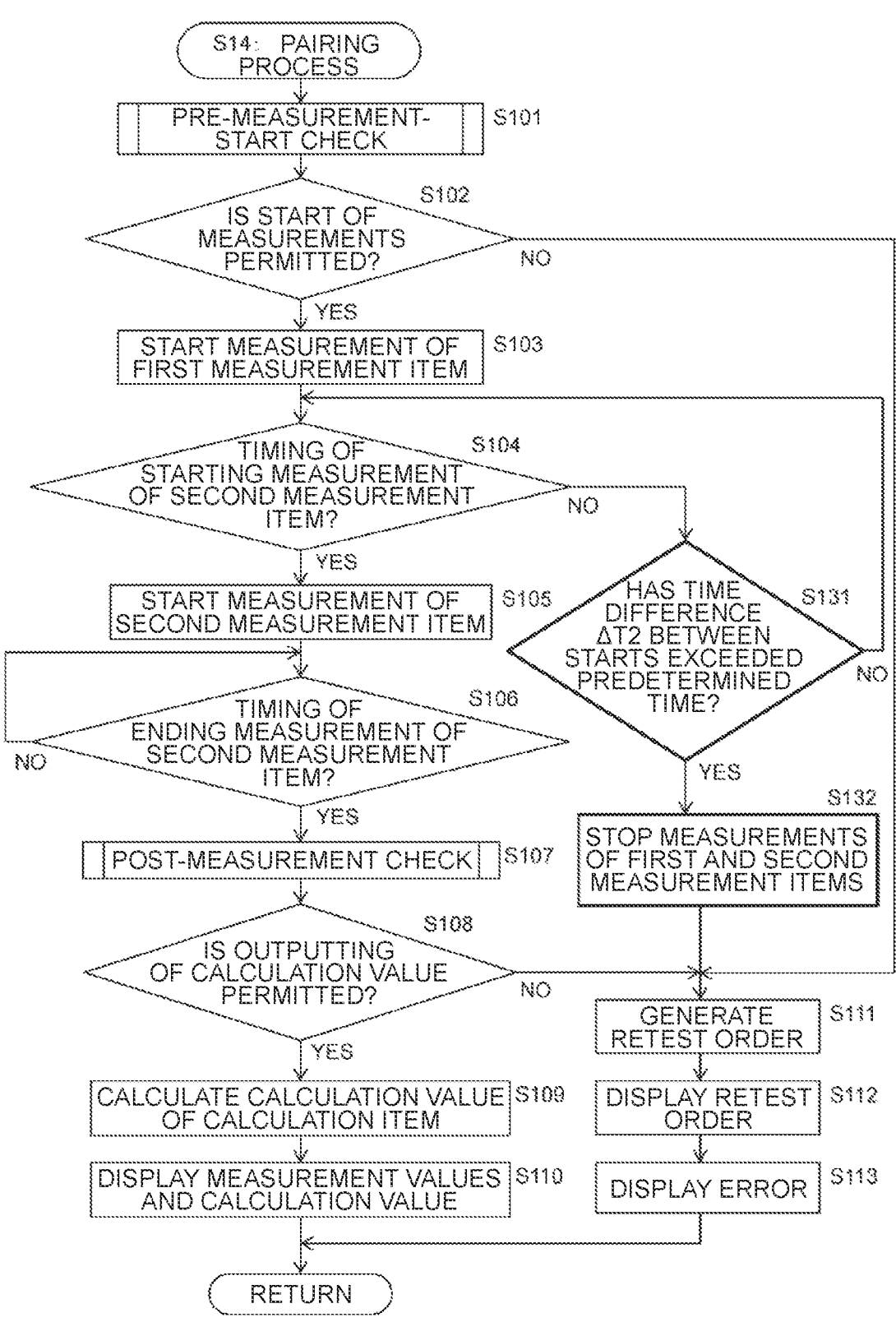
FIG. 29 is a flowchart showing a pairing process according to Embodiment 2.

FIG. 29 is a flowchart showing a pairing process according to Embodiment 2. In FIG. 29, the NO side of step S104 is not returned to step S104 but is advanced to steps S131 and S132 as compared to FIG. 19. Hereinafter, steps S131 and S132 will be described.

If the controller 101 determines, in step S104, that the timing of starting a measurement of the second measurement item has not come, the controller 101 determines, in step S131, whether or not the time having elapsed from the start of the measurement of the first measurement item has exceeded a predetermined time. The time point at which the measurement of the first measurement item has been started is stored in the storage unit 102 in step S321 in FIG. 28. The predetermined time to be used for determination in step S131 is the time interval having been set with the pull-down menu 232c in FIGS. 9 and 10.

Figure 30:
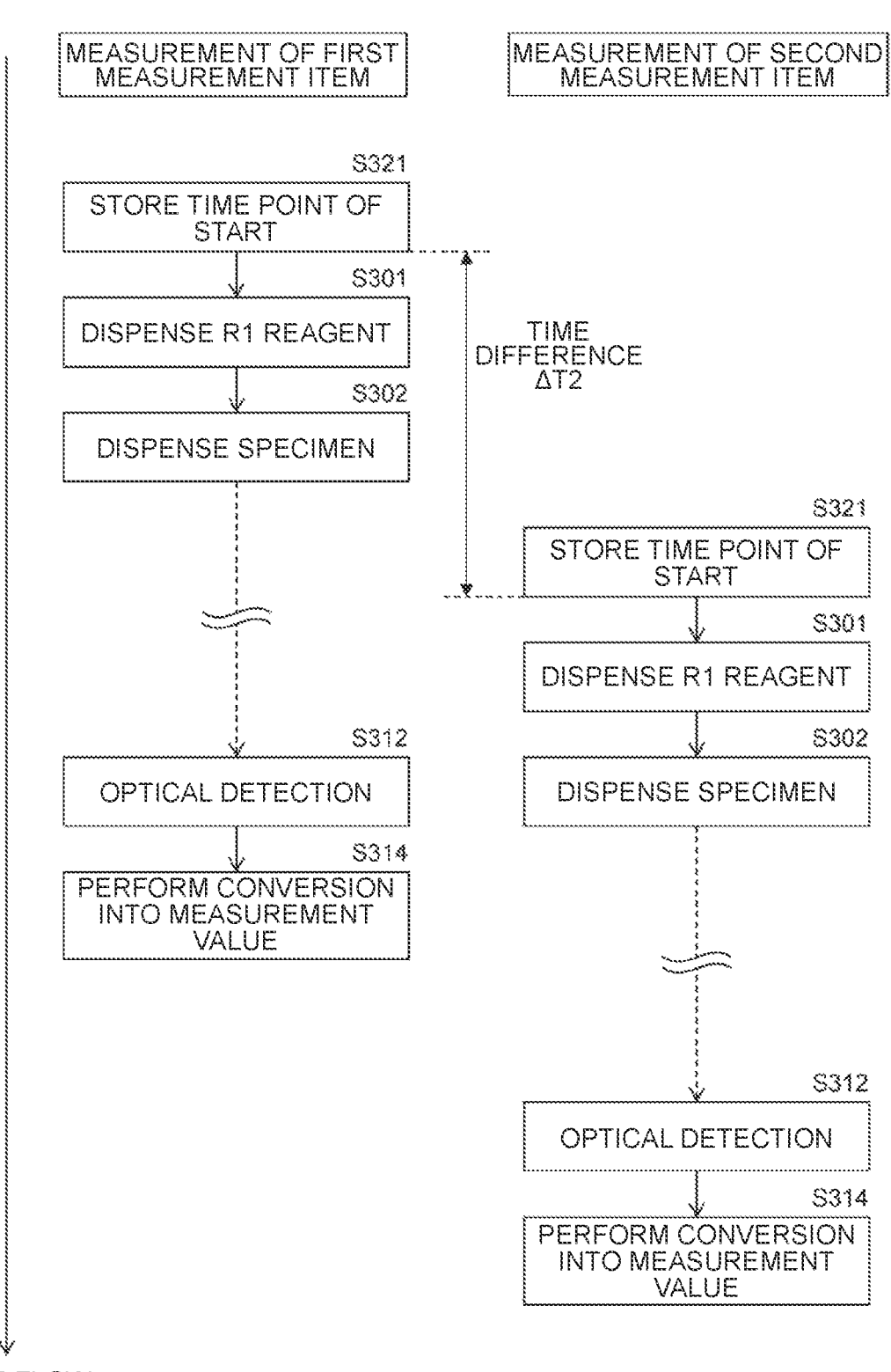
FIG. 30 is a time chart showing a measurement of the first measurement item and a measurement of the second measurement item, according to Embodiment 2.

FIG. 30 is a time chart showing a measurement of the first measurement item and a measurement of the second measurement item.

If the measurement rank of the second measurement item is subsequent to that of the first measurement item, a measurement of the second measurement item is suspended until it becomes possible to start a measurement of the second measurement item after a measurement of the first measurement item is started. Thus, as shown in FIG. 30, the timing of starting measurement differs between the first measurement item and the second measurement item. As a result, the start time points stored in step S321 also differ from each other. As shown in FIG. 30, the time difference $\Delta T2$, as to which determination is performed in step S131 in FIG. 29, is the difference between the timing at which the measurement of the first measurement item has been started and the timing at which the measurement of the second measurement item has been started.

With reference back to FIG. 29, if the time difference $\Delta T2$ does not exceed the predetermined time, the controller 101 returns the process to step S104 and determines again whether or not the timing of starting a measurement of the second measurement item has come. Meanwhile, if the time difference $\Delta T2$ exceeds the predetermined time, the controller 101 stops measurements of the first and second measurement items and prohibits outputting of a calculation value of the calculation item in step S132. Then, the controller 101 advances the process to step S111. When the measurements of the first and second measurement items are stopped in step S132, no calculation value of the calculation item is obtained.

Advantageous Effects of Embodiments 1 and 2

As described above, measurements of the first and second measurement items are preferably performed at as close timings as possible. Considering this, a process related to a time difference between a measurement of the first measurement item and a measurement of the second measurement item is executed in Embodiments 1 and 2.

As the process related to the time difference between a measurement of the first measurement item and a measurement of the second measurement item, for example, a process for setting the time difference between a measurement of the first measurement item and a measurement of the second measurement item to be equal to or shorter than the predetermined time is executed. As the process for setting the time difference between a measurement of the first measurement item and a measurement of the second measurement item to be equal to or shorter than the predetermined time, for example, processes are performed as shown in FIGS. 4 to 7, FIGS. 11 to 13, FIG. 17, and FIGS. 19, 27, and 29. The processes are: a process of receiving measurement ranks such that an interval between the two measurement items becomes equal to or shorter than the predetermined time; a process of registering a measurement order such that the two measurement items are registered; the notification process in step S15 in the case where the measurement order includes only one of the measurement items; a process of the pre-measurement-start check in step S101; a process of the post-measurement check in step S107; a process of generating a retest order in step S111; and a process of stopping measurements at elapse of the predetermined time in steps S131 and S132.

In addition, as the process related to the time difference between a measurement of the first measurement item and a measurement of the second measurement item, for example, a process of determining whether or not the time difference between a measurement of the first measurement item and a measurement of the second measurement item is equal to or shorter than the predetermined time is executed as in step S403 in FIGS. 22 and 26. If the time difference is equal to or shorter than the predetermined time, a calculation value of the calculation item AB42/40 is outputted. Meanwhile, if the time difference is not equal to or shorter than the predetermined time, outputting of a calculation value of the calculation item AB42/40 is prohibited. Alternatively, a calculation value and information indicating that the reliability of the calculation value is low, may be outputted. Consequently, the reliability of the calculation value of the calculation item obtained from the measurement value of the first measurement item and the measurement value of the second measurement item can be kept high.

In Embodiments 1 and 2, as the process for setting the time difference between a measurement of the first measurement item and a measurement of the second measurement item to be equal to or shorter than the predetermined time, a process of the pre-measurement-start check in step S101 in FIGS. 19 and 29 is performed. In this process, if the time difference between a measurement of the first measurement item and a measurement of the second measurement item is not to be equal to or shorter than the predetermined time, start of the steps of measuring the first measurement item and the second measurement item is prohibited in step S207 in FIG. 20. Accordingly, an operator exchanges the reagents or lowers the temperature of the room in which the specimen analyzer 1 is installed. Consequently, the measurement environment can be adjusted before measurements. Thus, measurements can be started in an environment that allows the time difference between a measurement of the first measurement item and a measurement of the second measurement item to be equal to or shorter than the predetermined time. In addition, measurements of the first and second measurement items can be prevented from being performed in a state where the time difference could exceed the predetermined time. Therefore, the consumption of each reagent can be reduced, and the process can be made efficient.

In Embodiments 1 and 2, whether or not the remaining amounts of the reagents to be used for measurements of the first measurement item and the second measurement item are equal to or larger than the necessary amounts for measurements of the first measurement item and the second measurement item, respectively, is determined in step S204 in FIG. 20. If either of measurements of the first and second measurement items is interrupted owing to shortage of a corresponding one of the reagents, the time difference becomes more likely to exceed the predetermined time. Considering this, measurements of the first and second measurement items are performed when it is determined that the remaining amounts of the reagents to be used for the first and second measurement items are equal to or larger than the necessary amounts for measurements of the first and second measurement items, respectively, whereby it becomes easy for the time difference to be made equal to or shorter than the predetermined time. Therefore, a highly reliable calculation value of the calculation item can be obtained.

In Embodiments 1 and 2, whether or not the reagents to be used for measurements of the first measurement item and the second measurement item have yet to reach the respective expiration dates, is determined in step S203 in FIG. 20. If either of measurements of the first and second measurement items is interrupted owing to arrival of the expiration date of a corresponding one of the reagents, the time difference becomes more likely to exceed the predetermined time. Considering this, measurements of the first and second measurement items are performed when it is determined that the reagents to be used for the first and second measurement items have yet to reach the respective expiration dates, whereby it becomes easy for the time difference to be made equal to or shorter than the predetermined time. Therefore, a highly reliable calculation value of the calculation item can be obtained.

In Embodiments 1 and 2, whether or not the environmental temperature in measurement is within the predetermined temperature range is determined in step S205 in FIG. 20. If the environmental temperature in measurement is not within the temperature range suitable for measurement, a measurement is kept interrupted until the environmental temperature falls within this temperature range. Thus, if the environmental temperature is not within the predetermined temperature range, the time difference becomes more likely to exceed the predetermined time. Considering this, measurements of the first and second measurement items are performed when it is determined that the environmental temperature is within the predetermined temperature range, whereby it becomes easy for the time difference to be made equal to or shorter than the predetermined time. Therefore, a highly reliable calculation value of the calculation item can be obtained.

In Embodiments 1 and 2, as the process for setting the time difference between a measurement of the first measurement item and a measurement of the second measurement item to be equal to or shorter than the predetermined time, reception of measurement ranks for measurement items is performed such that the interval between measurements of the first measurement item and the second measurement item becomes equal to or shorter than the predetermined time. Specifically, at the time of moving the blocks 211*a* for the first and second measurement items, the blocks 211*a* for the first or second measurement items are moved such that the blocks 211*a* for the first and second measurement items are kept in an adjacent state in the arrangement sequence or such that the blocks 211*a* are rearranged so as to be adjacent to each other, as shown in FIGS. 4 to 7. Consequently, it becomes easy for the time difference between measurements of the first and second measurement items to be made equal to or shorter than the predetermined time. Therefore, a highly reliable calculation value of the calculation item can be outputted.

In Embodiment 2, as the process for setting the time difference between a measurement of the first measurement item and a measurement of the second measurement item to be equal to or shorter than the predetermined time, measurements of the first and second measurement items are performed such that the time difference between the measurements becomes equal to or shorter than the predetermined time. Consequently, it becomes easy for the time difference between a measurement of the first measurement item and a measurement of the second measurement item to be made equal to or shorter than the predetermined time. Therefore, a highly reliable calculation value of the calculation item can be outputted.

Specifically, as the process for setting the time difference between a measurement of the first measurement item and a measurement of the second measurement item to be equal to or shorter than the predetermined time, determination is performed in step S131 in FIG. 29 as to whether or not the predetermined time has elapsed after start of a measurement of one of the first measurement item and the second measurement item and before start of a measurement of another one of the measurement items, i.e., whether or not the time difference ΔT2 between the starts has exceeded the predetermined time. If the predetermined time has elapsed, the measurement of the other one of the measurement items is stopped in step S132. Consequently, measurements of the first and second measurement items can be restarted after an operator ascertains the cause of the elapse of the predetermined time and solves the problem. Therefore, a highly reliable calculation value of the calculation item can be outputted. In addition, since a measurement of the other one of the measurement items is stopped at elapse of the predetermined time, the consumption of each reagent can be reduced.

In Embodiment 1, as the process for setting the time difference between a measurement of the first measurement item and a measurement of the second measurement item to be equal to or shorter than the predetermined time, determination is performed in step S403 in FIGS. 22 and 26 as to whether or not the time difference between the measurement of the first measurement item and the measurement of the second measurement item is equal to or shorter than the predetermined time. If the time difference exceeds the predetermined time, outputting of a calculation value of the calculation item is prohibited in step S405. Consequently, measurements of the first and second measurement items can be restarted after an operator ascertains the cause of the elapse of the predetermined time and solves the problem. Therefore, a highly reliable calculation value of the calculation item can be outputted.

In Embodiments 1 and 2, as the process for setting the time difference between a measurement of the first measurement item and a measurement of the second measurement item to be equal to or shorter than the predetermined time, generation of a measurement order including the first and second measurement items is performed in step S111 in FIGS. 19, 27, and 29 if the time difference between the measurements of the first and second measurement items has exceeded the predetermined time. Consequently, if the measurement steps of measuring the first and second measurement items are performed again on the basis of the newly generated measurement order, a possibility that the time difference ΔT1 becomes equal to or shorter than the predetermined time through the measurement steps arises. Therefore, a highly reliable calculation value of the calculation item can be obtained.

In Embodiments 1 and 2, if the time difference ΔT1, ΔT2 between the measurements of the first and second measurement items is equal to or shorter than the predetermined time, a calculation value of the calculation item is outputted to the display unit 103 in step S110 in FIGS. 19, 27, and 29.

Consequently, a highly reliable calculation value of the calculation item can be outputted.

In Embodiments 1 and 2, as the process for setting the time difference between a measurement of the first measurement item and a measurement of the second measurement item to be equal to or shorter than the predetermined time, a process of, if it is determined in step S12 in FIG. 17 that the measurement order includes only one of the first and second measurement items, notifying a user of a result of the determination is executed in step S15. Consequently, if, after the one of the first and second measurement items is measured, a measurement order including the other one of the measurement items is registered and the other one of the measurement items is measured, the time difference can be prevented from increasing. Therefore, the time difference between a measurement of the first measurement item and a measurement of the second measurement item can be set to be equal to or shorter than the predetermined time. In addition, if a user forgets to register either of the measurement items in an order, the user can be notified as to necessity of obtaining a calculation value of the calculation item. Therefore, a calculation value of the calculation item can be appropriately presented to the user.

Other Modifications

In Embodiments 1 and 2, the first measurement item is one of amyloid beta 1-40 and amyloid beta 1-42, and the second measurement item is another one of the amyloid beta 1-40 and the amyloid beta 1-42 in the descriptions made with reference to FIGS. 17 to 30. In other words, the pair of the first and second measurement items is composed of amyloid beta 1-40 and amyloid beta 1-42. However, the pair of the first and second measurement items is not limited to the above pair. The pair of the first and second measurement items only has to be composed of measurement items such that the reliability of a calculation value of a calculation item obtained from measurement values of the first and second measurement items is increased when the time difference between measurements of the first and second measurement items is equal to or shorter than a predetermined time.

For example, the first measurement item may be a first type of amyloid beta or amyloid beta precursor protein, and the second measurement item may be a second type of amyloid beta or amyloid beta precursor protein different from the first type, as long as such a condition is satisfied. The first and second measurement items may each be an amyloid beta or an amyloid beta precursor protein.

Specifically, the first measurement item may be one of amyloid beta 1-42 and amyloid beta precursor protein 669-711, and the second measurement item may be another one of the amyloid beta 1-42 and the amyloid beta precursor protein 669-711. In other words, the pair of the first and second measurement items may be composed of amyloid beta 1-42 and amyloid beta precursor protein 669-711. In this case, as a calculation value of the calculation item, a ratio between measurement values of amyloid beta 1-42 and amyloid beta precursor protein 669-711 can be used, for example.

Although the calculation value of the calculation item is a ratio obtained by dividing a measurement value of the second measurement item by a measurement value of the first measurement item in Embodiments 1 and 2, the calculation value may be a ratio obtained by dividing a measurement value of the first measurement item by a measurement value of the second measurement item. Alternatively, the calculation value of the calculation item may be a value obtained by subtracting a value obtained by multiplying a measurement value of the first measurement item by a predetermined value from a value obtained by multiplying a measurement value of the second measurement item by a predetermined value.

Although the calculation value of the calculation item is a calculation value obtained from a measurement value of the first measurement item and a measurement value of the second measurement item in Embodiments 1 and 2, the calculation value may be a calculation value obtained from three or more measurement values including a measurement value of the first measurement item and a measurement value of the second measurement item.

For example, the measurement items may be amyloid beta 1-40, amyloid beta 1-42, and amyloid beta precursor protein 669-711, and a calculation value of the calculation item may be obtained from measurement values of the respective measurement items. In this case, the controller 101 may obtain a calculation value by using, for example, an arithmetic expression including a ratio between amyloid beta 1-40 and amyloid beta 1-42 and a ratio between amyloid beta 1-42 and amyloid beta precursor protein 669-711. In addition, the controller 101 may execute at least one process out of a process for setting the time difference between a measurement of amyloid beta 1-40 and a measurement of amyloid beta 1-42 to be equal to or shorter than the predetermined time, and a process for setting the time difference between a measurement of amyloid beta 1-42 and a measurement of amyloid beta precursor protein 669-711 to be equal to or shorter than a predetermined time.

In Embodiments 1 and 2, the administrator who performs maintenance of the specimen analyzer 1 or the like operates the screens 230 in FIGS. 9 and 10, to input a condition regarding the time difference between measurements and a condition regarding the temperature inside the measurement device 2. However, the condition regarding the time difference and the condition regarding the temperature may be set by a user other than the administrator (for example, an operator who ordinarily operates the specimen analyzer 1). In this case, other screens corresponding to the screens 220 and 230 and capable of being operated with the authority of an operator may be displayed on the display unit 103, and the other screens may be configured to be able to receive conditions stricter than the conditions that are set by the administrator.

In Embodiments 1 and 2, as the process for setting the time difference between a measurement of the first measurement item and a measurement of the second measurement item to be equal to or shorter than the predetermined time, if no pair-forming measurement item is set in the measurement order (step S12: NO) in FIG. 17, a measurement of the pair-forming measurement item is performed when a measurement instruction for the pair-forming measurement item is inputted by an operator (step S16: YES). However, as the process for setting the time difference between a measurement of the first measurement item and a measurement of the second measurement item to be equal to or shorter than the predetermined time, if no pair-forming measurement item is set in the measurement order, a measurement of the pair-forming measurement item may be automatically performed without any instruction from the operator. In this case, for example, if a result of the determination in step S12 is NO in FIG. 17, the controller 101 sets the pair-forming measurement item in the measurement order and advances the process to step S14. Consequently, a measurement of the pair-forming measurement item is automatically performed.

Although measurements of the first and second measurement items are performed consecutively in Embodiments 1 and 2, these two measurements do not necessarily have to be performed consecutively. For example, in setting of measurement ranks shown in FIGS. 4 to 7, the controller 101 may receive input made such that the blocks 211*a* for the first and second measurement items are not adjacent to each other.

In this case, if a block 211*a* for another measurement item other than a calculation item is positioned between the blocks 211*a* for the first and second measurement items, the controller 101 may determine, on the basis of a time that is ordinarily taken to measure the other measurement item, whether or not the time difference between measurements of the first and second measurement items is to be equal to or shorter than the predetermined time. The controller 101 may be configured not to receive, upon determining that the time difference between the first and second measurement items is not to be equal to or shorter than the predetermined time, input made so as to move the block 211*a* for the other measurement item to the position between the blocks 211*a* for the first and second measurement items. Consequently, the time difference between measurements of the first and second measurement items is set to be equal to or shorter than the predetermined time.

In addition, in the screen 210 in FIGS. 4 to 7, the controller 101 may, instead of performing control such that the blocks 211*a* for the first and second measurement items and the calculation item are adjacent to each other, automatically set a sequence of measurements of measurement items, having been set in a measurement order, such that the time difference between measurements of the first and second measurement items becomes equal to or shorter than the predetermined time. For example, measurements of the first and second measurement items may be performed consecutively in the pairing process shown in FIG. 17 even if measurements of the first and second measurement items are set in the screen 210 so as not to be performed consecutively. Consequently, the time difference between measurements of the first and second measurement items can be set to be equal to or shorter than the predetermined time.

Although the time difference $\Delta T1$ in FIG. 23 and the time difference $\Delta T2$ in FIG. 30 are obtained as time differences between a measurement of the first measurement item and a measurement of the second measurement item in Embodiments 1 and 2, time differences are not limited thereto, and a time difference between processing timings in the same type of step for the two measurement items may be obtained. For example, a time difference between a processing timing of step S302 in FIG. 21 for the first measurement item and a processing timing of step S302 in FIG. 21 for the second measurement item may be obtained.

Although a calculation value of the calculation item is outputted to the display unit 103 in step S110 in FIGS. 19, 27, and 29 in Embodiments 1 and 2, the output destination is not limited thereto, and the calculation value of the calculation item may be outputted to another computer or the like via the communication unit 105.

In Embodiment 1, as the process for setting the time difference between a measurement of the first measurement item and a measurement of the second measurement item to be equal to or shorter than the predetermined time, the controller 101 executes the pre-measurement-start check in step S101 in FIG. 19 during the pairing process in step S14 in FIG. 17. However, the controller 101 may be configured to execute the pre-measurement-start check in step S101 upon registration of a measurement order and, if a result of the determination in any of steps S203, S204, and S205 in FIG. 20 is NO, prohibit the measurement items 1-40 and 1-42 from being registered in the measurement order or cause the display unit 103 to display an indication that the measurement items 1-40 and 1-42 cannot be registered.

In Embodiments 1 and 2, if a result of the determination as to permissibility of outputting of a calculation value in step S108 in any of FIGS. 19, 27, and 29 is NO, the controller 101 prohibits outputting of the measurement values of the respective measurement items 1-40 and 1-42 and a calculation value of the calculation item AB42/40. However, when the measurement values of the respective measurement items 1-40 and 1-42 have been obtained, the controller 101 may output the measurement values of the respective measurement items 1-40 and 1-42 and prohibit outputting of a calculation value of the calculation item AB42/40. In this case, the controller 101 may output, together with the calculation value of the calculation item AB42/40, information indicating that the reliability of the calculation value is low. Alternatively, the controller 101 may output the measurement values of the respective measurement items 1-40 and 1-42 and a calculation value of the calculation item AB42/40. In this case, the controller 101 may output, together with the measurement values of the respective measurement items 1-40 and 1-42 and the calculation value of the calculation item AB42/40, information indicating that the reliability of each of the measurement values and the calculation value is low.

Figure 31:
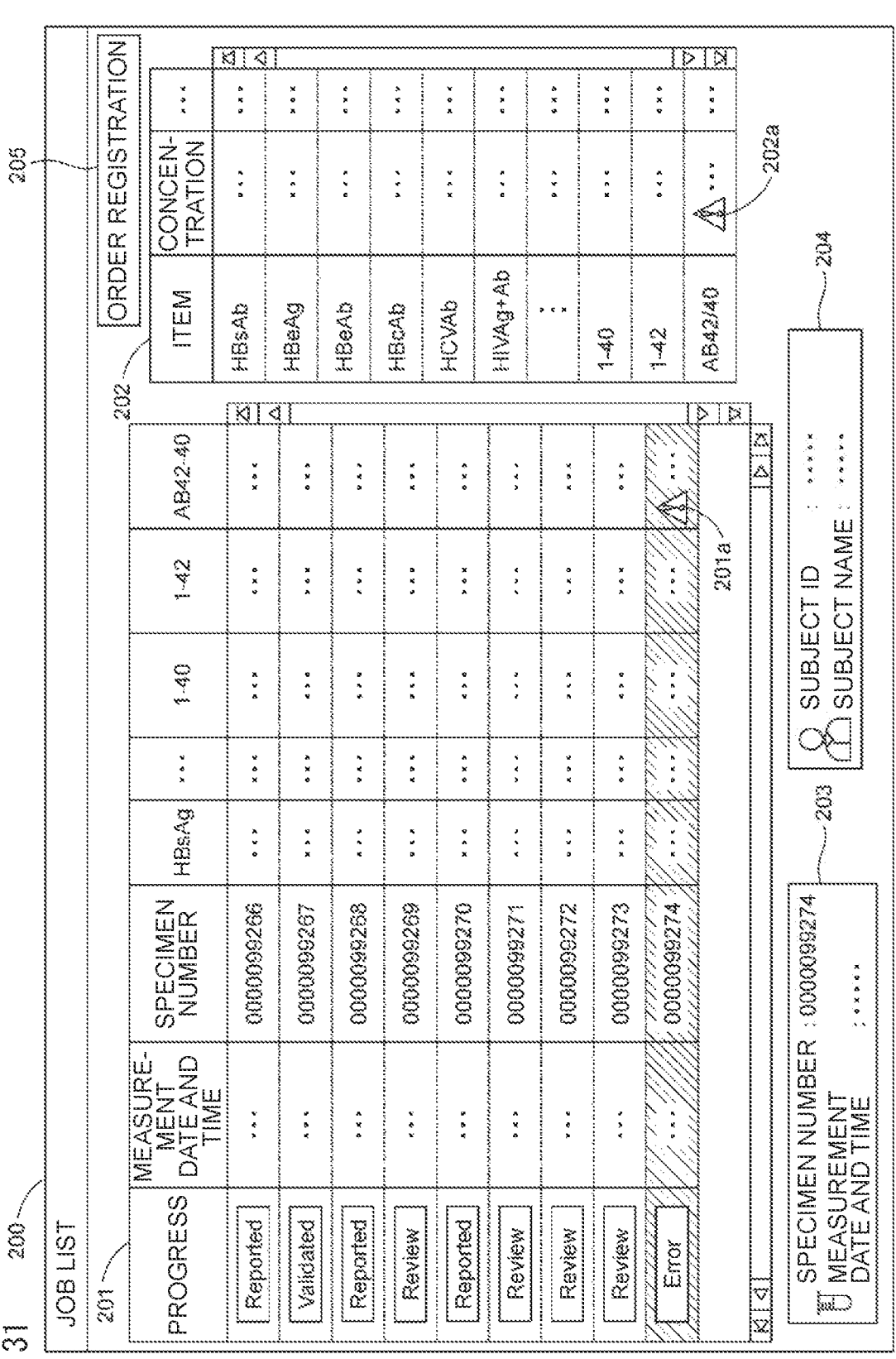
FIG. 31 schematically shows a configuration of a screen displaying a post-measurement job list, according to another modification.

FIG. 31 schematically shows a state where information indicating that the reliability is low is displayed in the screen 200 displayed on the display unit 103.

The job on the lowermost row in FIG. 31 indicates a state where, although measurement values of the respective measurement items 1-40 and 1-42 have been obtained, a result of the determination as to permissibility of outputting of a calculation value in step S108 is NO. In this case, in addition to the measurement values of the respective measurement items 1-40 and 1-42 and a calculation value of the calculation item AB42/40, icons 201a and 202a are displayed as information indicating that the reliability of the calculation value of the calculation item AB42/40 is low. An operator can ascertain that the reliability of the displayed calculation value is low, by referring to the icons 201a and 202a.

Although the controller 101 automatically generates a measurement order including the measurement items 1-40 and 1-42 in step S111 in FIGS. 19, 27, and 29 in Embodiments 1 and 2, the controller 101 may cause, in step S111, the display unit 103 to display any of the screens 240, 240a, and 240b (see FIGS. 11 to 13) for registering a measurement order so that input of a measurement item can be received from an operator. In this case, when an operator registers a measurement order including only one of the measurement items 1-40 and 1-42, the controller 101 may cause the display unit 103 to display a message that urges registration of another one of the measurement items as in the notification screen 260 in FIG. 18. Alternatively, when an operator registers a measurement order including only one of the measurement items 1-40 and 1-42, the controller 101 may automatically add the other one of the measurement items to the measurement order.

Although measurement values of the measurement items 1-40 and 1-42 are displayed on the display unit 103 in the specimen analyzer 1 according to each of Embodiments 1 and 2, the specimen analyzer 1 may be configured such that measurements of the measurement items 1-40 and 1-42 are executed only for obtaining a calculation value of the calculation item AB42/40, and the obtained measurement values are not outputted.

Although the specimen analyzer 1 according to each of Embodiments 1 and 2 is an immuno analyzer, the specimen analyzer 1 may be a mass spectrometer that ionizes molecules to be measured and performs mass separation of the ionized molecules, to detect moving ions.

Various modifications can be made as appropriate to the embodiments of the present disclosure, without departing from the scope of the technological idea defined by the claims.

What is claimed is:

1. An immunoassay analyzer configured to measure a target analyte in a specimen, comprising:
   a measurement device configured to perform measurement on the specimen, the measurement device comprising:
   a sample dispenser configured to dispense the specimen into a number of containers, wherein the number of containers is determined by a number of target analytes requested to measure by a measurement order issued for the specimen;
   a reagent dispenser configured to dispense an aliquot of reagent into each of the containers to prepare measurement samples, wherein the reagent is prepared in different types that each contain a different labeled antibody bound to a specific target analyte in the measurement sample; and
   a light detector configured to detect light excited out from the labeled antibody bound to the target analyte in each of the measurement samples; and
   a controller programmed to control the measurement device to measure the target analytes in the measurement samples requested to measure by the measurement order and obtain measurement values on the measured target analytes based on amounts of lights detected by the light detector,
   wherein the controller is programmed to control the measurement device to:
   prepare a first measurement sample from one specimen to measure a first target analyte and a second measurement sample from said one specimen to measure a second target analyte in response to the measurement order requesting measurement of the first and second target analytes, wherein the first target analyte is a first type of protein, and the second target analyte is a second type of protein; and
   perform a first measurement on the first measurement sample to obtain a first measurement value representative of an amount of the first type of protein in the first measurement sample and a second measurement on the second measurement sample to obtain a second measurement value representative of an amount of the second type of protein in the second measurement sample,
   wherein the controller is programmed to perform the first measurement and perform the second measurement at a measurement interval after the first measurement is performed,
   wherein the controller is programmed to calculate an arithmetic relationship between the first measurement value and the second measurement value,
   wherein the controller is further programmed to set the measurement interval equal to or less than a predetermined time interval to suppress a decrease of reliability of a calculation result of the arithmetic relationship due to a temporal degrading of the first and second types of proteins, and wherein setting the measurement interval comprises at least one of (a) or (b):

(a) determining by the controller, before preparation of the first and second measurement samples, if it is possible to perform the first and second measurements at a time interval equal to or less than the predetermined time interval, and wherein the controller is programmed to execute the preparation of the first and second measurement samples in response to a determination that the time interval is equal to or less than the predetermined time interval; or (b) determining by the controller, after performing the first and second measurements, if the second measurement has been performed within the predetermined time interval after the first measurement had been performed, and wherein the controller is programmed to execute the calculation of the arithmetic relationship between the first measurement value and the second measurement value in response to a determination that the second measurement has been performed within the predetermined time interval after the first measurement had been performed.

2. The immunoassay analyzer of claim 1, wherein setting the measurement interval further comprises prohibiting by the controller, before preparation of the first and second measurement samples, the preparation of the first and second measurement samples in response to a determination that the time interval is longer than the predetermined time interval.

3. The immunoassay analyzer of claim 1, wherein setting the measurement interval further comprises prohibiting by the controller, before preparation of the first and second measurement samples, the preparation of the first and second measurement samples in response to a determination that remaining amounts of reagents used, respectively, for the first and second measurements are less than threshold amounts enough to perform the first and second measurements, respectively.

4. The immunoassay analyzer of claim 1, wherein setting the measurement interval further comprises prohibiting by the controller, before preparation of the first and second measurement samples, the preparation of the first and second measurement samples in response to a determination that one of reagents used for the first and second measurements is past its expiration date.

5. The immunoassay analyzer of claim 1, wherein setting the measurement interval further comprises prohibiting by the controller, before preparation of the first and second measurement samples, the preparation of the first and second measurement samples in response to a determination that an environmental temperature in the measurement device is without a predetermined temperature range.

6. The immunoassay analyzer of claim 1, wherein the controller is programmed to generate a previously presented measurement order for the specimen to measure the first and second target analytes in response to a determination that the second measurement has been performed past the predetermined time interval after the first measurement had been performed.

7. The immunoassay analyzer of claim 1, wherein the controller is programmed to issue a notification that measurements of both first and second types of protein are not requested, in response to receipt of a measurement order that requests a measurement of only one of the first and second types of protein.

8. The immunoassay analyzer of claim 1, wherein the controller is programmed to control the measurement device to measure the first and second types of proteins in response to a determination that the measurement order requests measurements of both first and second types of proteins.

9. The immunoassay analyzer of claim 1, wherein
the controller is programmed to monitor an environmental temperature at the measurement device during the first and the second measurements,
the first type of protein includes amyloid beta 1-40 and the second type of protein includes amyloid beta 1-42, and
an allowable temperature range to perform the first measurement is narrower than an allowable temperature range to perform the second measurement.

10. The immunoassay analyzer of claim 1, wherein calculating the arithmetic relationship between the first and second measurement values comprises calculating a ratio between the first measurement value and the second measurement value.

11. The immunoassay analyzer of claim 1, wherein the first type of protein includes a first type of amyloid beta or amyloid beta precursor protein, and the second type of protein includes a second type of amyloid beta or amyloid beta precursor protein different from the first type.

12. The immunoassay analyzer of claim 11, wherein the first type of amyloid beta or amyloid beta precursor protein includes one of amyloid beta 1-40 and amyloid beta 1-42, and the second type of amyloid beta or amyloid beta precursor protein includes another one of the amyloid beta 1-40 and the amyloid beta 1-42.

13. The immunoassay analyzer of claim 12, wherein the first type of amyloid beta or amyloid beta precursor protein includes one of amyloid beta 1-42 and amyloid beta precursor protein 669-711, and the second type of amyloid beta or amyloid beta precursor protein includes another one of the amyloid beta 1-42 and the amyloid beta precursor protein 669-711.

* * * * *